(12) United States Patent (10) Patent No.: US 7,688,348 B2
Lubard et al. (45) Date of Patent: *Mar. 30, 2010

(54) LIDAR WITH STREAK-TUBE IMAGING, INCLUDING HAZARD DETECTION IN MARINE APPLICATIONS; RELATED OPTICS

(75) Inventors: Stephen C. Lubard, Woodland Hills, CA (US); John W. McLean, Tucson, AZ (US); David N. Sitter, Jr., Tucson, AZ (US); J. Kent Bowker, Essex, MA (US); Anthony D. Gleckler, Tucson, AZ (US)

(73) Assignee: Arete' Associates, Northridge, CA (US)

( * ) Notice: Subject to any disclaimer, the term of this patent is extended or adjusted under 35 U.S.C. 154(b) by 979 days.

This patent is subject to a terminal disclaimer.

(21) Appl. No.: 11/023,299

(22) Filed: Dec. 27, 2004

(65) Prior Publication Data

US 2007/0035624 A1 Feb. 15, 2007

Related U.S. Application Data

(63) Continuation of application No. 09/390,487, filed on Sep. 3, 1999, now Pat. No. 6,836,285.

(51) Int. Cl.
*H04N 7/18* (2006.01)
*G01P 3/36* (2006.01)
(52) U.S. Cl. .................................... 348/144; 356/28.5
(58) Field of Classification Search .................. 348/31, 348/33, 81, 144; 356/28.5; 89/1.13; 367/12, 367/88; 244/116
See application file for complete search history.

(56) References Cited

U.S. PATENT DOCUMENTS

| | | | | | |
|---|---|---|---|---|---|
| 3,641,484 | A | * | 2/1972 | White et al. | 367/12 |
| 4,210,399 | A | * | 7/1980 | Jain | 356/28.5 |
| 4,611,313 | A | * | 9/1986 | Ziese | 367/88 |
| 5,034,810 | A | * | 7/1991 | Keeler | 348/31 |
| 5,123,615 | A | * | 6/1992 | Wagner et al. | 244/116 |
| 5,384,589 | A | * | 1/1995 | Ulich et al. | 348/31 |
| 5,448,936 | A | * | 9/1995 | Turner | 89/1.13 |
| 5,450,125 | A | * | 9/1995 | Ulich et al. | 348/31 |
| 5,467,122 | A | | 11/1995 | Bowker et al. | |
| 5,528,493 | A | | 6/1996 | Potter | |
| 6,400,396 | B1 | * | 6/2002 | Bowker et al. | 348/81 |

* cited by examiner

*Primary Examiner*—Gims S Philippe
(74) *Attorney, Agent, or Firm*—Peter I. Lippman

(57) ABSTRACT

The system and method relate to detection of objects that are submerged, or partially submerged (e.g. floating), relative to a water surface. One aspect of the invention emits LIDAR fan-beam pulses and analyzes return-pulse portions to determine water-surface orientations and derive submerged-object images corrected for refractive distortion. Another defines simulated images of submerged objects as seen through waves in a water surface, prepares an algorithm for applying a three-dimensional image of the water surface in refractive correction of LIDAR imaging through waves—and also models application of the algorithm to the images, and finally specifies the LIDAR-system optics. Yet another emits nearly horizontal pulses to illuminate small exposed objects at tens of kilometers, detects reflected portions and images successive such portions with a streak-tube subsystem. Still others make special provisions for airborne objects.

24 Claims, 16 Drawing Sheets

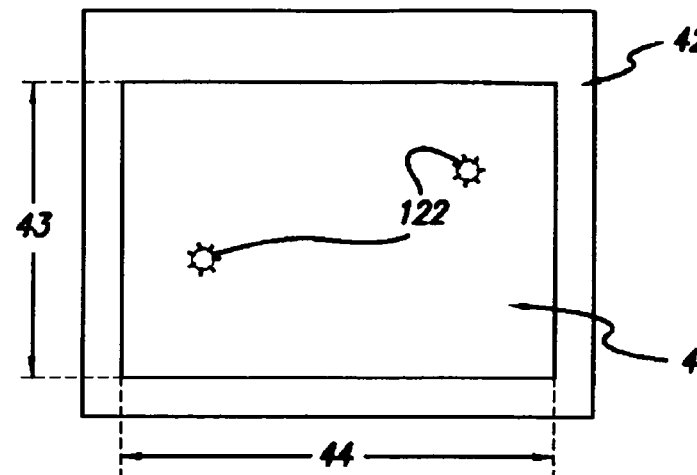
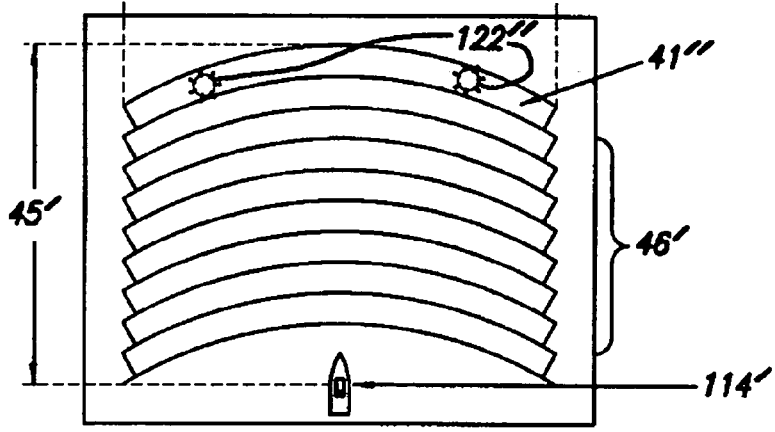
FIG. 7
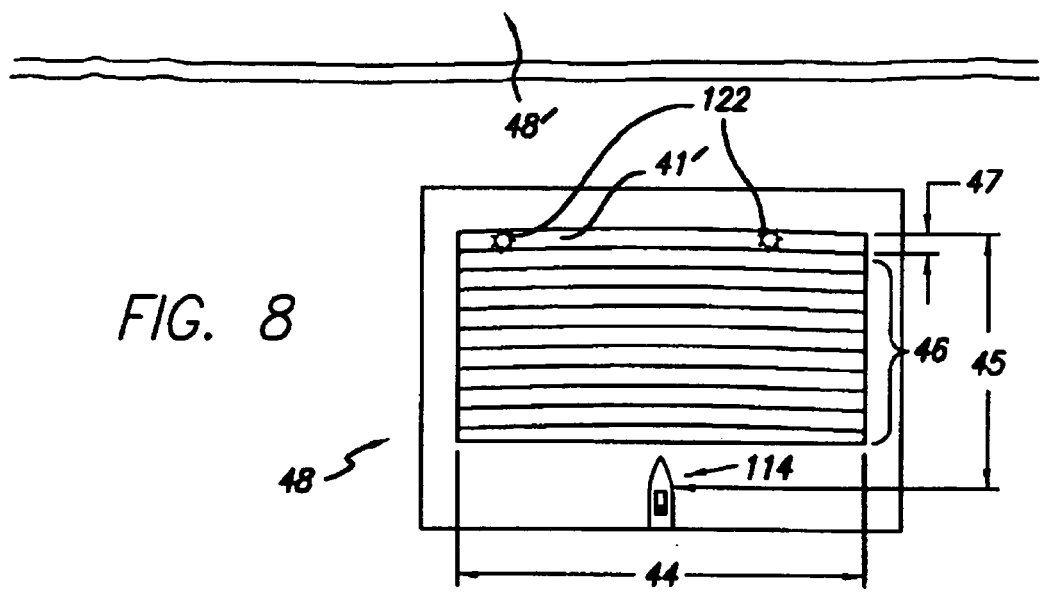
FIG. 8

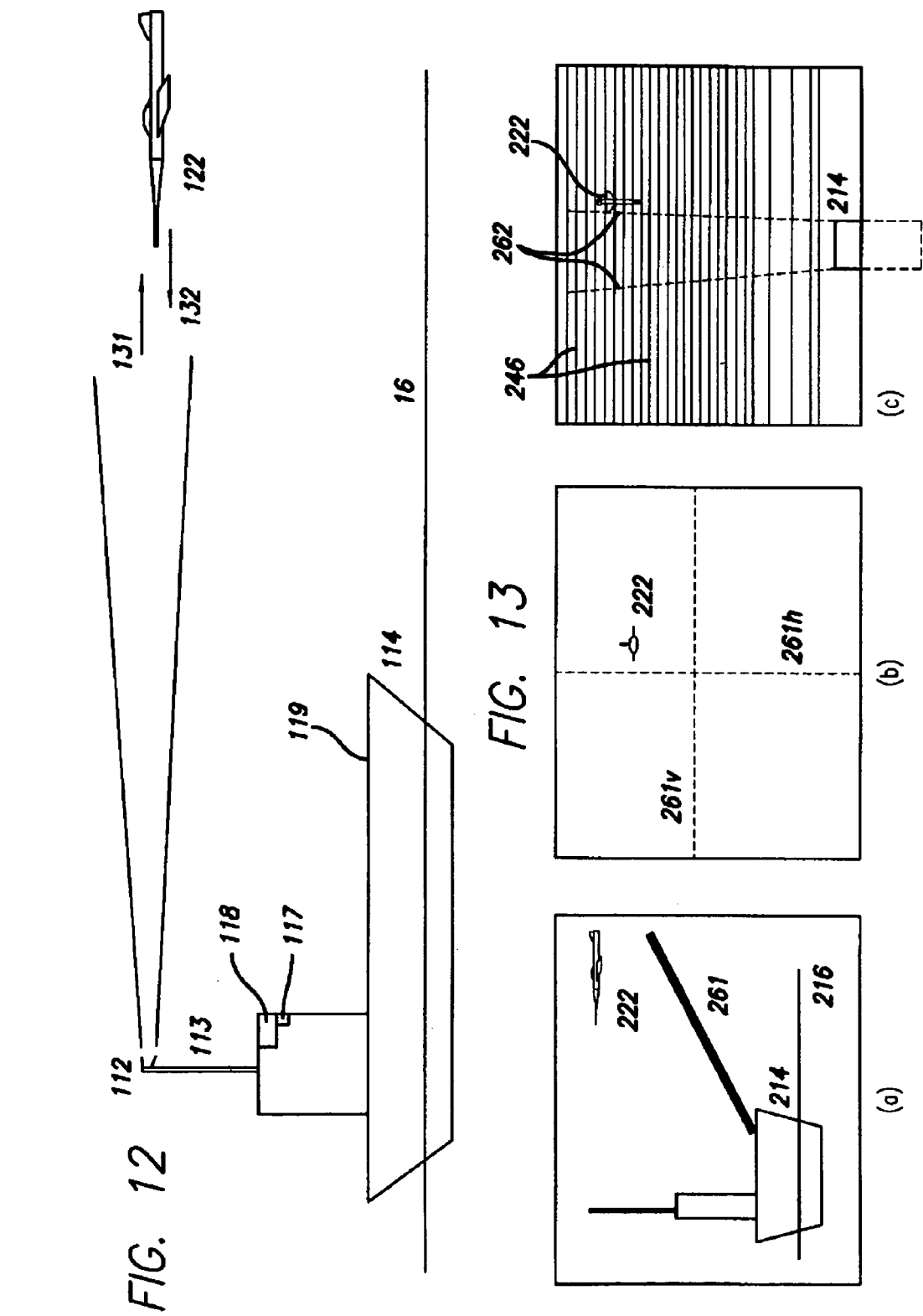

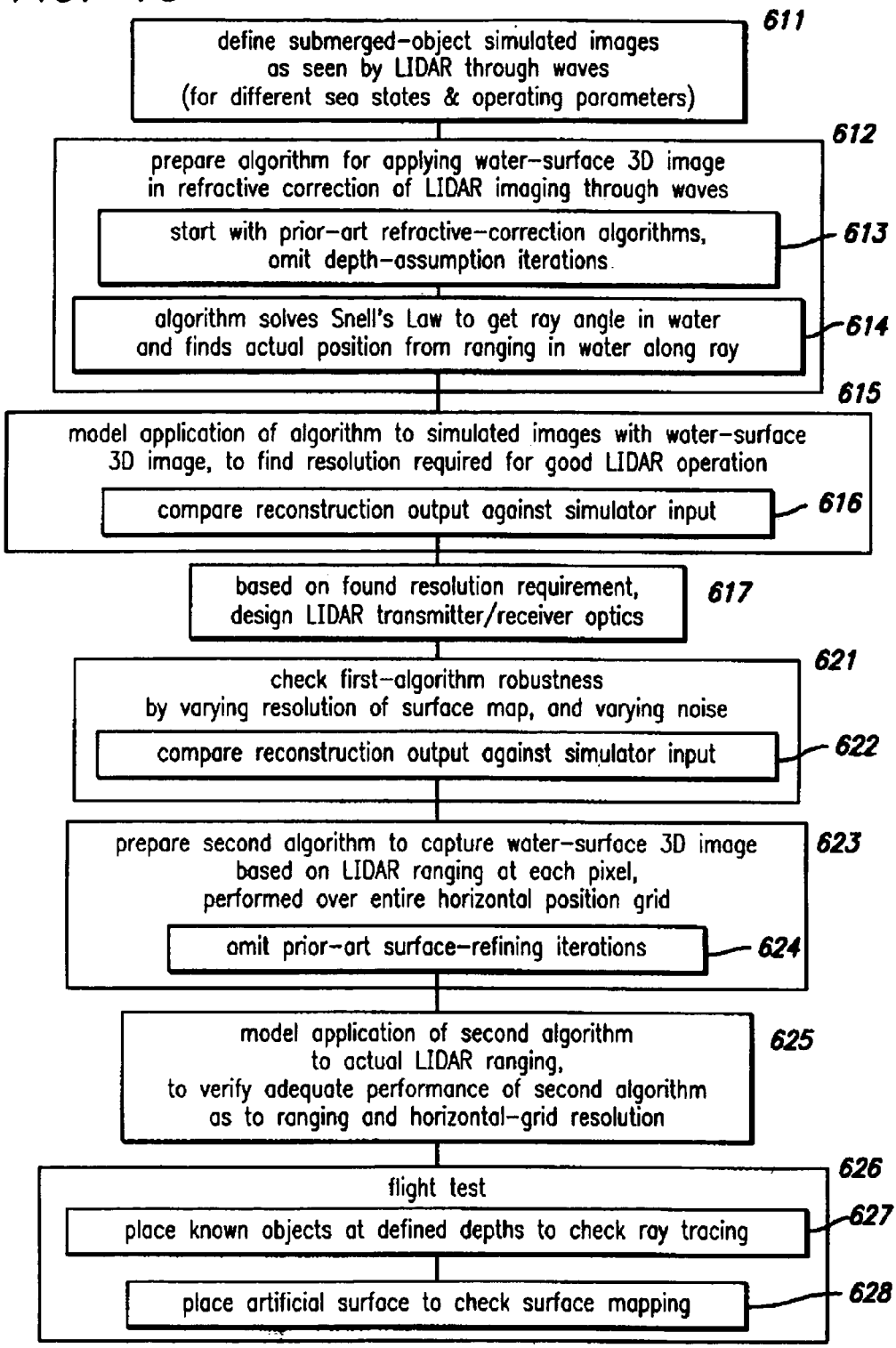

Water Surface Position          Water Depth

LIDAR WITH STREAK-TUBE IMAGING, INCLUDING HAZARD DETECTION IN MARINE APPLICATIONS; RELATED OPTICS

This application is a continuation of Ser. No. 09/390,487 filed on Sep. 3, 1999 U.S. Pat. No. 6,836,285.

BACKGROUND

1. Field of the Invention

This invention relates generally to optoelectronic systems for imaging objects from an elevated or slightly elevated observing instrument. Such imaging systems include but are not limited to mast-mounted systems for obtaining warning of shallow hazards ahead of a water craft, aircraft-carrier landing aids, and refinements in airborne imaging platforms. A related aspect of the invention provides intensity equalization across a fan-shaped probe beam, and has general industrial applications.

2. Related Art

Shallow-angle marine observation systems—A particular difficulty of all marine observational systems, even visual systems, is the problem of interference by the water surface. Reflections at the surface, whether of ambient radiation or of probe beams, tend to be confused with signals or signatures of the hazards or other objects of interest.

Another noteworthy problem with such systems is the limited range of known apparatus and methods. In the past, short range has been seen as essentially an inherent limitation of mast-mounted or other only-slightly-elevated equipment.

It is known to use light detection and ranging ("LIDAR") for such purposes. FIG. 1 illustrates an experimental deployment shown by Anderson, Howarth and Mooradian ("*Grazing Angle LIDAR for Detection of Shallow Submerged Objects*", Proc. International Conference on Lasers, 1978).

Anderson et al. did a pier-based experiment with a single-pixel PMT detector and no scanner. Basically they verified the laws of physics, namely (1) Snell's Law predicting deflection of the light into the water, and (2) the laws of radiative transfer—the light detection and ranging or "LIDAR" equation—predicting enough returning photons to support a detection. There was no suggestion of an entirely practical implementation for such an idea.

More specifically, the Anderson paper describes use of grazing-incidence LIDAR for detection of shallow objects. The group detected a target of diameter about 80 centimeters (2½ feet), to depths of nearly 5 meters (15 feet) at a range of 130 meters (400 feet) from a pier.

The experimental demonstration used a narrow-beam LIDAR and a photomultiplier-tube detector. The laser L (FIG. 1) and receiver R were mounted in a hut-like enclosure E on a pier structure S in the ocean, at distance F of about 330 m (1100 feet) forward from the beach.

The LIDAR transceiver L-R was at a height H of about 13 m (40 feet) above the ocean surface O. At the pier the benthic depth D1 was some 5 m (15 feet) and at the target T the depth D2 was about 8 m (25 feet).

A winch W on the pier operated a chain CH around a first pulley P1, fixed by a clamp CL to the pier S. The chain extended out to the floating target T via a second pulley P2, which was tethered to an anchor A (in the form of concrete-filled 55-gallon drums)—thus enabling some variation in range R as desired, the nominal value of the range R being 120 m (400 feet). The severely constrained range associated with these experiments is exemplary of the limitations of shallow-angle object surveillance heretofore.

We are aware of these patents for mast-mounted television cameras used for imaging objects from slightly elevated positions: U.S. Pat. Nos. 3,380,358 and 3,895,388. Pertinent LIDAR-related patents include:

U.S. Pat. No. 4,862,257 of Ulich,
U.S. Pat. No. 4,920,412 of Gerdt,
U.S. Pat. No. 5,013,917 of Ulich
U.S. Pat. No. 5,034,810 of Keeler,
U.S. Pat. No. 5,091,778 of Keeler,
U.S. Pat. No. 5,257,085 of Ulich,
U.S. Pat. No. 5,450,125 of Ulich,
U.S. Pat. No. 5,384,589 of Ulich and
U.S. Pat. No. 5,506,616 of Scheps.

The most relevant of these are the last three Ulich patents mentioned.

Ulich et al. use a streak tube for time-resolved fluorescence (wavelength vs. time), not imaging (angle vs. time). In fact, their text particularly cites use of a streak tube in a nonimaging mode. Furthermore they use a laser blocking filter to specifically reject the in-band response.

Thus the prior art fails to deal incisively, or effectively, with the previously mentioned problems of interference arising from surface reflection. Utilization of a slit by the Ulich group is for spectral dispersion, not imaging.

The '589 Ulich patent, "Imaging LIDAR System", makes one reference to a ship-based application, but does not develop the idea further. The system is described only with reference to gated, intensified cameras.

Airborne-hazard alert for water craft—LIDAR is also usable for obtaining information about airborne objects, whether threatening hostile objects or otherwise. A separate system for such purposes, however, is costly and occupies significant space in the command center of a water craft.

Aircraft-carrier operations—In addition to detection of floating and airborne obstacles (e. g. mines and other hazards), another marine-related problem that would benefit from visibility aids is that of aircraft-carrier landing. This problem is particularly acute at night, and in fog or other turbid-atmosphere conditions.

The difficulty of such operations is compounded by the high speeds involved, the fact that not only the aircraft but also the carrier is in motion. A further complication sometimes is the need for a degree of discreet or covert character in the traffic. Radio guidance may be of limited practicality in such circumstances.

Airborne surveillance—Still another use of LIDAR systems that has been developed heretofore is airborne surveillance of objects submerged in the ocean or in other bodies of water. U.S. Pat. No. 5,467,122—commonly owned with the present document—sets forth many details of a surveillance system that is particularly aimed at monitoring relatively large areas of the ocean.

In that system, typically imaging is limited to detection from altitudes of at least 160 m (500 feet) and looking straight down into the water with the center of the probe beam. Still, there is some off-axis detection for positions well away from the track of the airborne platform.

Wave noise, and distortion: Wave noise and the resultant image distortion represent one of the severest limitations for airborne surveillance, even in the clearest ocean waters. These concerns have not been adequately addressed with existing airborne LIDAR systems. According to a comparative-evaluation field test in 1997, object-classification capability and the ability to reject false alarms in hazard detection have yet to be achieved to the satisfaction of the United States government.

Both the shapes and the positions of submerged objects are distorted by uncorrelated refractions of different parts of the probe/return beam, due to irregularity of the water surface. Heretofore no effort has been directed to overcoming either the positional error or the relative vagueness of object shapes obtained with this technology.

Uncertainties in coverage: Current systems also provide inadequate information about the fraction of the undersea environment that is actually being screened. The root problem is that wave focusing and defocusing of rays from a LIDAR system cause gaps in the coverage at different depths.

That is to say, inherently certain volumes of water receive and reflect very little light, which means that objects within those volumes cannot be detected. The difficulty here is that existing systems cannot accurately estimate the extent of these effects at different depths, and therefore cannot generate good area-coverage estimates at those depths.

There is no reliable measurement of how well—in particular, how uniformly—the system is illuminating and imaging each layer of water. Such systems resort to a statistical model, based on a single estimate of sea state, to estimate how many passes over the same patch of water are necessary to assure proper coverage.

This model is hard to validate—and the estimate of sea state may or may not be accurate or timely. Errors in the sea-state estimate force present systems to make either too many passes over the same area, which results in poor effective area-coverage rates, or too few passes, which may leave the area inadequately sampled and so unsafe for ship transit.

Refractive-correction: A hitherto unrelated technology is reported in another coowned patent, U.S. Pat. No. 5,528,493—which teaches use of observations from below an irregular water surface, i. e. by stationary or very slowly moving submerged apparatus. This latter patent refines images collected in such observations by correcting for effects of refraction at each point of the surface.

No effort heretofore has been directed to adapting this technology to either surveillance of the sea from either aircraft or surface water craft. This method requires a height map of the ocean-wave surface—to find all the refraction directions and so solve Snell's law for each spot.

To obtain such a height map, preferred forms of the patented method depend in turn upon iterative determination of the dynamic surface condition. These forms of the method therefore rely heavily upon the essentially stationary character of the observing platform, and are accordingly too slow for use with fixed-wing surveillance aircraft.

Since the method of the '493 patent is able to determine only bearing, not range—from any single observation apparatus—image reconstruction is impossible from such a single apparatus. Image reconstruction accordingly requires data from two observation subsystems separated by a known baseline and working in tandem.

Reconstruction is then accomplished through the sort of dual-station baseline triangulation that is familiar in surveying. Although the requirement of a long baseline is acceptable for waterborne observation platforms that are very large, and so intrinsically can provide a long baseline, such a requirement is undesirable for airborne surveillance as it calls for a very large aircraft operating at very low altitudes—or alternatively introduces the additional complications of plural aircraft conducting a coordinated surveillance.

Algorithms to reconstruct the distorted images of underwater targets as seen from above the surface have, however, been developed by M. S. Schmalz et al. Some of this work is reported in "Rectification of refractively-distorted imagery acquired through the sea surface—an image algebra formulation", in *Proceedings SPIE* 1350 (1990); and "Errors inherent in the restoration of imagery acquired by viewing through remotely-sensed refractive interfaces and scattering media", in *Proceedings SPIE* 1479 (1991).

In the reported work, a subsurface image is reconstructed iteratively, starting with assumptions about the depth of observed objects. Results from the Schmalz group have not been applied in the LIDAR context, or to airborne surveillance generally.

Glint interference with volume backscatter: Another hitherto unrelated field of work, previously addressed only in the context of bottom mapping, is due to G. C. Guenther et al. For decades they have studied and documented the problem of confusion between surface glints and probe-beam backscatter from the ocean volume.

Their studies, however, are exclusively in support of airborne laser bathymetry ("Airborne Laser Hydrography—System Design and Performance Factors", *NOAA Professional Paper Series*, U.S. Department of Commerce, National Ocean Service 1, 1985). Guenther and his team have produced a large body of data and algorithms for processing such data.

Limitations due to fan-beam properties: Yet another obstacle to optimum practice of the innovations set forth in the U.S. Pat. No. 5,467,122 patent is the difficulty of obtaining uniform energy distribution and consistent divergence angle in the fan beam. Typically a single cylindrical lens is used to expand a laser beam of generally circular cross section, in just one dimension, into a fan shape.

In practice a high-energy pulsed laser beam is neither stable in size and position nor uniform in energy distribution, across the cross-section of the beam. Even a stable laser beam of uniform energy distribution, however, when thus spread to form a fan-shaped beam is nonuniform in intensity when it reaches the water surface (or any object plane)—due to long propagation distances required to reach the water at the extreme ends of the "fan".

The propagation distance at each end of the fan is greater than that at the center by a factor equal to the secant of the fan half-angle. The beam divergence over this greater propagation distance proportionately reduces the beam brightness at the water surface—and the return reflection must also travel farther, additionally aggravating the brightness reduction at the detector.

It may be mentioned that the added travel distance also increases the return time at the fan-beam extremes. This delay, however, is wholly geometrical and therefore readily compensated in software; the accompanying brightness reduction cannot be resolved so easily.

Depending upon the character of the reflection process itself, the added return distance may produce either another factor of the secant, or instead another factor of the square of the secant. For components of the return beam that are generated through essentially specular reflection —such as the glints mentioned earlier, or even some specular portions of the volume backscatter—the incident beam angles in all directions should be approximately maintained in the return light and this implies that the same. proportional decrease in energy should develop again.

For components of the return beam that arise through true volume scattering, however, the distribution of energy in the reflection process should be omnidirectional. If it were distributed equally in all directions (not usual, but only a limiting case that can help to understand likely actual behavior), then the spatial distribution would follow a familiar inverse-square law—leading to attenuation of light from the fan-beam extremes by the square of the secant.

In practice a rather complicated and unknown added attenuation is likely to occur in those regions. The mix of phenomena can be mathematically modeled, and also measured empirically for a variety of conditions, to determine what factor of either added gain or added brightness would equalize volume backscatter under representative conditions. Application of that factor in increased gain or brightness may be expected to overcompensate with respect to brightness of glints—but this is unavoidable in view of the different reflection mechanisms involved, as explained above.

Because a gain-control approach would fail to equalize SNR across the fan-beam track, however, such an approach—although within the scope of the invention—is unappealing. It would lead to a systemic variation in SNR variation within every image, always.

In other words, information at the wings of the data array would be chronically both less clear and less reliable than information at the center. Hence the conceptual approach of adjusting the outgoing energy distribution in the LIDAR excitation beam is greatly preferable to a gaincontrol approach.

The '122 patent adopts precisely such an approach; it describes a way of roughly equalizing the energy received from the ends of the fan with that at the center. The rough equalization is obtained by halving a particular type of lens—and then reassembling the halves in opposite orientation.

This is done in such a way that rays are more concentrated at the limbs of the fan, tending to compensate very roughly for the longer divergence paths in those regions. Although extremely helpful, this system does not truly flatten the energy distribution along the intersection of the fan beam with the water surface, even in theory—and even for the volume backscatter as distinguished from the glints.

When the above-mentioned beam instabilities and nonuniformities are taken into consideration, the problem is far more severe. A laser beam generally varies in beam position, as well as energy distribution, from pulse to pulse.

The positional wandering takes the center of the beam off the center of the reassembled double-half-lens structure described above. This drift degrades the operating assumptions behind that device, and correspondingly disrupts its performance in equalizing energy at the limbs vs. the center of the fan.

The distributional drift enormously complicates any effort to systematically compensate for known departures from often-assumed "top-hat" or Gaussian energy distributions in the beam cross-section. Trying to correct for a constantly changing, unknown, high-power energy profile that is gone a nanosecond after it starts is a virtual impossibility with present-day technology—and stabilization of a high-power laser against both positional and distributional drifts is essentially prohibitive.

In fact even nominal alignment is a relatively onerous task. Preferably not simply the geometrical center of the beam but rather the effective center, in terms of maximum energy flux (or in terms of optimized energy flux over the entire fan-beam span) should be centered upon the reassembled lens structure.

Thus alignment becomes a matter of attempting to place the drifting effective center—of a beam of inhomogeneous and varying energy distribution, and varying position too—at the centerline of the reassembled lens structure. This is challenging.

As can now be seen, the related art remains subject to significant problems. The efforts outlined above—while praiseworthy—have left room for considerable refinement.

SUMMARY OF THE DISCLOSURE

The present invention introduces such refinement, and thus importantly advances the art. The invention has several facets, or aspects, that are capable of use independently. For greatest enjoyment of their benefits and advantages, however, all or several of these facets are best employed in combination together.

In preferred embodiments of a first of its independent aspects or facets, the invention is a system for detecting objects from an elevated position. The system includes a LIDAR subsystem, mounted at such a position.

The LIDAR subsystem emits thin fan-beam light pulses at a shallow angle, and detects reflected portions of the fan-beam pulses at a like shallow angle. The system also includes a streak-tube subsystem for imaging successive reflected fan-beam pulse portions.

The foregoing may be a description or definition of the first facet or aspect of the present invention in its broadest or most general terms. Even in such general or broad form, however, as can now be seen the first aspect of the invention resolves the previously outlined problems of the prior art.

In particular the combination of streak tube with pulsed fan beam offers imaging capabilities and spatial resolution far in advance of all shallow-angle systems known heretofore. The Anderson and Ulich documents, mentioned earlier, offer no hint of using a streak tube either to resolve targets at different ranges or even merely to facilitate imaging.

Although the first major aspect of the invention thus significantly advances the art, nevertheless to optimize enjoyment of its benefits the invention is preferably practiced in conjunction with additional features or characteristics. In particular, when the first facet of the invention is used particularly for detecting such objects that are mines or obstacles from such an elevated position on a craft, preferably the shallow angle is a vertical angle. The vertical angle may be defined either relative to the horizontal or relative to such a craft or its path.

Another preference is that the streak-tube subsystem image successive reflected fan-beam pulse portions at corresponding successive positions on a display screen. The streak-tube system thereby forms on the screen a representation of such objects as a function of distance from the craft.

Preferably the system includes a mast or high bridge on such craft, for providing such elevated position for mounting of the LIDAR subsystem. In this case preferably the system also includes such craft itself.

Yet another preference for the first aspect of the invention, particularly when used in detecting objects submerged near a water craft, is that the shallow angle approximate grazing incidence with a water surface near the craft. In this case preferably the thin fan beam illuminates a swath on the order of sixty centimeters (two feet) wide, measured generally in the propagation direction along the water surface.

Preferably the shallow angle is in a range of approximately one to fifteen degrees. Still more preferably the shallow angle is in a range of approximately two to ten degrees—and ideally it is roughly five degrees.

Another preference is that the thin fan beam be on the order of 2.5 centimeters (one inch) thick. Still another preference is that the system further include some means for applying a compensation for reduced energy near lateral ends of the fan beam. In this case preferably the compensation-applying means include a lenslet array or other spatially variable amplitude compensator for variations due to the fan-beam propagation distances—in conjunction with the inverse radial dependence of energy density in the diverging beam. Using a lenslet array is preferable as it can render the fan angle substantially independent of input-beam position and size; and such an array also tends to homogenize the fan beam.

It is also preferable to apply another kind of correction for depth errors arising from retardation in the same regions—i.e., near the lateral ends of the beam. This type of correction is preferably performed in software.

Now turning to a second of the independent facets or aspects of the invention: in preferred embodiments of this second facet, the invention is a system for detecting objects near a water craft. The system includes a LIDAR subsystem, mounted to the water craft at an elevated position.

The LIDAR subsystem is for emitting thin fan-beam light pulses at a shallow angle, and for detecting reflected portions of the fan-beam pulses at a like shallow angle. In addition the system includes some means for imaging successive reflected fan-beam pulse portions. For purposes of breadth and generality in discussing this second aspect of the invention, these means will be called simply the "imaging means".

The foregoing may represent a description or definition of the second aspect or facet of the invention in its broadest or most general form. Even as couched in these broad terms, however, it can be seen that this facet of the invention importantly advances the art.

In particular, this second independent aspect of the invention—unlike the first—is addressed specifically to detection of objects near a water craft and to the use of apparatus mounted e. g. to a mast, flying bridge or other elevated point of the craft. In this environment, or context, the use of a shallow-angle fan-beam introduces a very great advancement in spatial resolution generally and in range and depth discrimination specifically—even though, in this second facet of the invention as broadly defined, the imaging system does not necessarily include a streak tube.

As mentioned above, the specifically discussed Anderson and Ulich patents fail to suggest use of a fan beam. The teachings of other Ulich patents are far removed from ship-based detection of mines or other objects near a water craft.

Although the second major aspect of the invention thus significantly advances the art, nevertheless to optimize enjoyment of its benefits the invention is preferably practiced in conjunction with additional features or characteristics. In particular, preferably the imaging means include some means for imaging successive reflected fan-beam pulse portions at corresponding successive positions on a display screen.

As before, in this preferred variant the imaging means form on the screen a representation of such objects as a function of distance from the water craft. It is particularly preferable in this case, when the system is used with a craft that is in motion, that the imaging means further include means for scrolling the successive lines generally synchronously with such motion.

Other important preferences include those mentioned earlier for the first independent aspect of the invention, relating to inclusion of a mast or high bridge, a water craft, specific shallow-angle ranges, and specific angles and beam dimensions, etc.

In preferred embodiments of its third major independent facet or aspect, too, the invention is a system for detecting objects near a water craft. The system includes some means for emitting thin fan-beam light pulses at a shallow angle, and for detecting reflected portions of the fan-beam pulses at a like shallow angle.

Again for breadth and generality, these means will be called simply the "emitting and detecting means". The emitting and detecting means are mounted to the water craft at an elevated position.

The system also includes a streak-tube subsystem for imaging successive reflected fan-beam pulse portions. The foregoing may represent a description or definition of the third aspect or facet of the invention in its broadest or most general form. Even as couched in these broad terms, however, it can be seen that this facet of the invention importantly advances the art.

In particular, in this aspect of the invention the emitting and detecting means are not necessarily a LIDAR subsystem as such. Nevertheless the application of thin fan-beam pulses projected at a shallow angle—and also detected at a like angle—provides enhanced geometry with improved range and depth resolution in object detection for water craft.

Although the third major aspect of the invention thus significantly advances the art, nevertheless to optimize enjoyment of its benefits the invention is preferably practiced in conjunction with certain additional features or characteristics. In particular certain preferences outlined for the first two facets of the invention are applicable here as well—including for instance use of a display screen to image successive reflected fan-beam pulse portions at corresponding successive positions on the screen, use of a mast or high bridge for the apparatus, and operation at grazing incidence with a water surface.

In preferred embodiments of its fourth major independent facet or aspect, again, the invention is a system for detecting objects near a water craft. The system includes a LIDAR subsystem, mounted to such a craft, for emitting thin fan-beam light pulses toward such objects and for detecting reflected portions of the fan-beam pulses.

Also included are some means for imaging successive reflected fan-beam pulse portions. Again for generality these means will be called simply the "imaging means".

In this fourth aspect of the invention, the imaging means perform this function in a way that tightly localizes reflection from a water surface near such objects. In this way the imaging means facilitate detection of such objects despite proximity to the water surface.

The foregoing may represent a description or definition of the fourth aspect or facet of the invention in its broadest or most general form. Even as couched in these broad terms, however, it can be seen that this facet of the invention importantly advances the art.

In particular, whereas all the aspects of the invention have favorable performance in regard to the problem of surface-reflection interferences, this fourth facet of the invention is particularly addressed to that problem. By tightly localizing surface reflection, the fourth independent aspect of the invention enables discrimination between return signals due to that reflection and signatures of the objects of interest.

Although the fourth major aspect of the invention thus significantly advances the art, nevertheless to optimize enjoyment of its benefits it is preferable to practice the invention with additional features or characteristics. In particular, it is preferable that the imaging means also include some means for displaying successive reflected pulse-portion images at corresponding successive different portions of a display screen. In this case the imaging means image the surface reflection from water, near such objects, in a narrow range of closely adjacent portions of the screen.

In preferred embodiments of its fifth major independent facet or aspect, the invention is a system for detecting objects submerged, or partially submerged, relative to a water surface. This system includes a LIDAR subsystem for emitting thin fan-beam light pulses from above such water surface toward such objects and for detecting reflected portions of the fan-beam pulses.

In addition the system includes some means for analyzing the reflected pulse portions to determine water-surface orientations. In addition these means (the "analyzing means") operate to derive, from these water-surface orientations, submerged-object images corrected for refractive distortion.

The foregoing may represent a description or definition of the fifth aspect or facet of the invention in its broadest or most general form. Even as couched in these broad terms, however, it can be seen that this facet of the invention importantly advances the art.

In particular, this aspect of the invention is actually able to take account of refraction at the complex surface, and thereby to discern not only range but also depth, shape and orientation of objects. In this way the invention becomes enormously valuable in that an operator can obtain enough information to accurately characterize each object individually, and the likely nature of its interaction with the craft—and so assess the avoidance or other options that may be available.

This facet of the invention is therefore greatly advanced over the Schmalz system, which requires iteration from initial assumptions about target depth. The present invention not only is much faster because it requires no such iteration, but also because it can yield pictures of submerged objects that are actually corrected for refraction by individual wave facets—as distinguished from mere correction for refraction by the sea surface considered as approximately planar.

Although the fifth major aspect of the invention thus significantly advances the art, nevertheless to optimize enjoyment of its benefits preferably the invention is practiced invention with additional features or characteristics. In particular, preferably the analyzing means include some means for using precise range resolution of the reflected pulse portions to determine the water-surface orientations.

In this regard the invention can also be made greatly superior to imaging as taught be the previously mentioned '493 patent, which employs iterations at a different stage in the imaging process—namely, in the finding of a surface map. Here too the present invention is much faster, sufficiently fast in fact that it can be operated in real time from a fixed-wing aircraft overflying an ocean region.

In addition preferably the analyzing means include some means for applying Snell's Law—in conjunction with the determined water-surface orientations—to develop corrections for refraction at such water surface. In this way the invention operates directly and straightforwardly on information in the reflected pulses to determine the desired details about submerged or partly submerged objects.

It is also preferable in some embodiments of this type of through-the-surface-from-above system—particularly embodiments in which the LIDAR subsystem is mounted to a water craft—to use measurements of the water-surface positions and orientations that are all consistent over the entire field or frame of view. To accomplish this, in certain embodiments of this fifth aspect of the invention the LIDAR subsystem preferably includes a deflection device that sweeps a succession of the thin fan-beam light pulses across the objects and the water surface rapidly. For example, the deflection may operate starting generally at the horizon and sweeping downward to some shallow downward angle looking into the water, and then returning to the initial generally horizontal position to sweep again.

More specifically, the rapidity of pulsing and of sweep are preferably rapid enough to substantially capture all the water-surface orientations in a consistent common configuration. Ordinarily this calls for completing the entire sweep within a moderately small fraction of a second, such as for example roughly one five-hundredth to one hundredth of a second.

In other embodiments of this fifth aspect of the invention, deflection is achieved by movement of an aircraft that carries the LIDAR subsystem bodily along, above the water surface. In this case the center of the fan beam preferably is directed vertically toward the water, and the narrow dimension of the beam spans a distance on the order of one meter to a few meters at the water surface.

Thus, to begin with, in these other embodiments the consistent common configuration of the water surface holds only over that distance. The sweep in this case is not cyclical but rather continuous, moving progressively forward with the position of the aircraft over the water.

Nevertheless in this case too, the rapidity of pulsing and the velocity of the aircraft are preferably selected to provide a generally continuous advance with nearly consistent common configuration of the water surface in adjacent or overlapping measurement swaths. The data-analysis system then preferably sorts out the progressive movement of the surface itself from the progression of data in the LIDAR snapshots.

Usually in airborne operation, as compared with shallow-angle applications, a larger fraction of the water surface is disposed for specular reflection of the LIDAR beam. In airborne surveillance the glint problem is therefore ordinarily more severe.

A sixth major independent aspect or facet of the invention is related to the fifth. The sixth is a method of putting into operation a LIDAR system that corrects for refraction in LIDAR imaging through waves in a water surface.

The method includes the step of defining simulated images of submerged objects as seen through waves in a water surface with a LIDAR system. It also includes the step of preparing an algorithm for applying a three-dimensional image of the water surface in refractive correction of LIDAR imaging through waves.

The method also includes the step of modeling application of the algorithm to the simulated images—using an assumed or actual three-dimensional image of the surface. This step is conducted in such a way as to determine requirements of range and pixel resolution for successful operation of the LIDAR system.

Another step, based upon the determined range and pixel resolution requirements, is preparing optics for the LIDAR system. The sixth facet of the invention as thus generally defined has the advantage of eliminating iteration from the hardware-specification stage—the needed resolution is built into the hardware the first time.

Nevertheless this facet of the invention is advantageously performed incorporating certain preferences. Thus preferably the modeling is performed using a broad range of simulated images—in particular, simulated images prepared using a broad variation of assumed water-surface and atmospheric conditions, as well as assumptions about the submerged objects.

Another preference is preparing a second algorithm for capturing a three-dimensional image of the water surface based on ranging data obtained with a LIDAR system over a generally horizontal grid of positions, and modeling application of the second algorithm to actual ranging data obtained with a LIDAR system. This preference operates to verify adequate performance of the second algorithm as to the critically needed resolution in the ranging direction and in horizontal grid directions.

In preferred embodiments of its seventh major independent facet or aspect, the invention is a system for detecting objects from an elevated position. The system includes a scanning-spot LIDAR subsystem, mounted at such a position. This subsystem performs three functions: (1) emitting a series of narrow light pulses at a shallow angle and successively displaced in an arc, (2) repeating the emitting to form successive arcs, and (3) detecting reflected portions of the pulses at a like shallow angle.

In addition the system includes a streak-tube subsystem for imaging reflected pulse patterns from the successive arcs. The streak-tube subsystem images the reflected pulse patterns as successive lines on a display screen.

The foregoing may represent a description or definition of the seventh aspect or facet of the invention in its broadest or most general form. Even as couched in these broad terms, however, it can be seen that this facet of the invention importantly advances the art.

In particular, this facet of the invention is able to achieve many of the same benefits as other aspects of the invention, but without the high pulse power and without the special optics needed to provide a unitary, suitably shaped fan beam. This seventh facet of the invention trades off those requirements for some added electronics—and some form of beam-displacement capability—needed to effectuate the arcuate succession of incremental pulses.

Although the seventh major aspect of the invention thus significantly advances the art, nevertheless to optimize enjoyment of its benefits it is preferable to practice the invention with additional features or characteristics. In particular, especially if the system is for use in a craft that is in motion, preferably the streak-tube subsystem further comprise some means for scrolling the successive lines generally synchronously with such motion.

Now in preferred embodiments of its eighth major independent facet or aspect, the invention is a system for detecting small exposed objects such as floating debris, at ranges on the order of tens of kilometers. This system includes a LIDAR subsystem.

In this eighth facet of the invention, the LIDAR subsystem is for performing two functions: (1) emitting nearly horizontal, thin fan-beam light pulses to illuminate such exposed objects at ranges on the order of tens of kilometers, and (2) detecting nearly horizontal reflected portions of the fan-beam pulses returned from such exposed objects. The system also includes a streak-tube subsystem for imaging successive reflected fan-beam pulse portions.

The foregoing may represent a description or definition of the eighth aspect or facet of the invention in its broadest or most general form. Even as couched in these broad terms, however, it can be seen that this facet of the invention importantly advances the art.

As will be understood by those skilled in this field, the shallow-angle or "nearly horizontal" condition imposes extreme demands upon the time-resolution capability of any system that is called upon to discriminate between various objects, or between such objects and a surface return. In particular, this facet of the invention exploits the extraordinary time-resolution capability of the streak tube to obtain hitherto unheard-of range performance—despite the nearly horizontal projection and recovery of the fan beam.

Although the eighth major aspect of the invention thus significantly advances the art, nevertheless to optimize enjoyment of its benefits preferably the invention is practiced with additional features or characteristics. In particular, since personnel over kilometer ranges will be exposed to the probe beam, preferably the light pulses are made eye-safe.

For this purpose preferably the light pulses are in the near infrared. One ideal wavelength is approximately 1.54 microns.

In preferred embodiments of its ninth major independent facet or aspect, the invention is a landing-aid system for use in facilitating aircraft landings on an aircraft carrier. The system includes a LIDAR subsystem, mounted to such a carrier, for performing two functions: (1) emitting light pulses to illuminate such aircraft, and (2) detecting reflected portions of the pulses returned from such aircraft. This system also includes a streak-tube subsystem for imaging successive reflected pulse portions.

The foregoing may represent a description or definition of the ninth aspect or facet of the invention in its broadest or most general form. Even as couched in these broad terms, however, it can be seen that this facet of the invention importantly advances the art.

In particular, no known art, heretofore, teaches how to make use of LIDAR or streak-tube technology in such applications. In this case if a shallow angle is employed, the shallow angle may be inverted (i. e. upward rather than downward), and refractive phenomena may not be a factor. Yet much of the same operating principle is applicable.

Although the ninth major aspect of the invention thus significantly advances the art, nevertheless to optimize enjoyment of its benefits it is preferable to practice the invention with additional features or characteristics. In particular, since incoming pilots are exposed directly to the pulses it is particularly preferable that the light pulses be eye-safe.

Again therefore preferably the light pulses are in the near infrared, and perhaps ideally at approximately 1.54 microns. We also prefer to incorporate some means, responsive to the streak-tube subsystem, for providing real-time measurement of (1) position of such aircraft relative to a desired approach path, or (2) range of such aircraft relative to the aircraft carrier, or (3) range-rate of such aircraft relative to a desired approach path—and most preferably all of these measurements in combination.

In preferred embodiments of a tenth major independent facet or aspect, the invention is an integrated system for detecting objects submerged, or partially submerged, relative to a water surface near a water craft—and also for detecting airborne objects. This system includes a LIDAR subsystem, mounted to the craft, emitting thin fan-beam light pulses from above the water surface and for detecting reflected portions of the fan-beam pulses.

The pulses are emitted both toward submerged, or partially submerged, objects and also toward airborne objects exclusively. The integrated system also includes dual means for analyzing the reflected and detected portions of the pulses.

The dual means include, first, some means for analyzing returns of pulse portions emitted toward submerged, or partially submerged, objects. This analysis determines water-surface orientations, and therefrom derives submerged-object images corrected for refractive distortion.

The dual analyzing means include, second, some means for separately analyzing the reflected and detected portions of pulses emitted toward the airborne objects exclusively. This second part of the analysis derives airborneobject images.

The foregoing may represent a description or definition of the tenth aspect or facet of the invention in its broadest or most general form. Even as couched in these broad terms, however, it can be seen that this facet of the invention importantly advances the art.

In particular, this integrated system makes maximal use of the hardware, and most of the software, used in the screening for obstacles or weaponry in the water—to check also, concurrently, for weapons or other features that are airborne. In this way the integrated system achieves an extremely high cost efficiency, as well as space efficiency in the typically crowded quarters of a water-craft bridge or surveillance room.

Although the tenth major aspect of the invention thus significantly advances the art, nevertheless to optimize enjoyment of its benefits the invention is preferably practiced in conjunction with certain additional features or characteristics. In particular, preferably the first analyzing means also recognize and image low-altitude airborne objects.

Objects of this sort are within the narrow vertical range between the horizon and the water surface as seen from, for instance, a mast-mounted LIDAR subsystem. Such recognition is advantageously based e. g. upon discrimination of pulse returns that precede any surface-flash return for adjacent regions in the field of view.

Also preferably the LIDAR subsystem includes means for sweeping a sequence of the light pulses across such submerged, or partially submerged, objects and such airborne objects in a substantially continuous succession.

By the word "across" here, it is intended to include sweeping the pulse sequence across the scene vertically, particularly since this is a favored configuration. Thus in this preferred mode of practice of the tenth aspect of the invention, the sequence of pulses typically proceeds without interruption from scanning above the horizon to scanning below the horizon—or vice versa.

This uninterrupted sequencing is adopted even though the analytical stage, the analyzing means, must apply algorithms for the above-horizon returns that are different from those for the below-horizon returns. The benefits of uninterrupted sequencing include full coverage, and relative simplicity of the apparatus.

It might be reasoned that this preference pays a modest penalty in wasted optical energy and wasted pulse time—since there are some portions of the sweep that are below the horizon but too close to the horizon to return useful information about submerged objects. As suggested earlier, however, this zone (as well as the region where submerged objects are seen easily) may contain airborne objects of interest.

In preferred embodiments of its eleventh major independent facet or aspect, the invention is a LIDAR system for imaging objects. The system includes a pulsed light source.

It also includes an array of lenslets receiving light pulses from the source and forming from those pulses a pulsed fan-shaped beam of the light for projection toward such objects to be imaged. The system additionally includes light detectors receiving portions of the pulsed fan-shaped beam reflected from such objects, and developing corresponding image signals in response to the reflected portions.

The system further includes some means for analyzing the signals to determine characteristics of such objects or to display successive images of such objects. For generality in this document these means will be called the "analyzing means".

The foregoing may represent a description or definition of the eleventh aspect or facet of the invention in its broadest or most general form. Even as couched in these broad terms, however, it can be seen that this facet of the invention importantly advances the art.

In particular, as will be detailed below, the use of a lenslet array to form a fan-shaped beam from a conventional input light beam introduces—in one stroke—solutions to several of the earlier-described knotty problems. These include spatial drift of beam position and size, and particularly the dependence of both fan-beam angle and spatial energy distribution upon those variables; and also the problems of alignment difficulty and of imprecise compensation for the cosine effect in energy distribution along the water-fan interface.

At the same time the use of a lenslet array offers the beam-homogenizing benefits previously known only in somewhat remote fields such as lighting for photolithography. For present purposes this represents an incidental benefit.

Although the eleventh major aspect of the invention thus very significantly advances the art, nevertheless to optimize enjoyment of its benefits the invention is preferably practiced in conjunction with certain additional features or characteristics. In particular, advantageously the LIDAR system analyzing means include a streak tube for generating the images.

Also preferably the array of lenslets, in forming the fan-shaped beam, modifies the angular distribution of light with respect to a long cross-sectional dimension of the fan shape; in this case ideally the array of lenslets increases the energy at lateral extremes of the fan shape. A particularly beneficial application of this aspect of the invention is for a system in which the pulsed light source is a laser.

Other preferences, as noted earlier, include combination of this facet of the invention with others of the independent aspects or facets under discussion. Among these are the first ten facets discussed above—as well as shaping of the lenslet surfaces, and matching of refractive and diffractive properties, as introduced below.

In preferred embodiments of its twelfth major independent facet or aspect, the invention is a light-projection system. The system includes a light source, and an array of lenslets receiving light from the source and forming therefrom a fan-shaped beam of the light for projection.

In this aspect of the invention the lenslets have surfaces that modify the angular distribution of light with respect to a long cross-sectional dimension of the fan shape. More particularly the array of lenslets increases the energy at lateral extremes of the fan shape.

The foregoing may represent a description or definition of the twelfth aspect or facet of the invention in its broadest or most general form. Even as couched in these broad terms, however, it can be seen that this facet of the invention importantly advances the art.

In particular, this aspect of the invention enables an extremely valuable equalization of the light-beam intensity at lateral extremes. This is especially useful in flattening the energy distribution along a laterally extended track such as the intersection of the beam with a generally planar surface, e. g. an ocean surface—the primary application for most of the other aspects of the invention.

This aspect of the invention, however, is by no means limited to providing such equalization. To the contrary, this facet of the invention is far more broadly applicable for a wide range of special situations—including, for example, either equalizing or deliberately introducing a variation in the intensity along an intersection of the beam with surfaces of other shapes.

Such shapes for instance may be spherical, cylindrical, ellipsoidal, planar but angled relative to the beam front, etc.—or entirely arbitrary. Even this, however, is not the full extent of this facet of the invention.

It can also be used to modify illumination patterns along a track that is not defined by a physically demarcated surface. For instance this aspect of the invention in principle can be used to uniformly illuminate a rectilinear path within a fluid medium—as for measurement of scattering, fluorescence, Raman excitation or the like, either by the medium or by particles suspended in it.

Although the twelfth major aspect of the invention thus significantly advances the art, nevertheless to optimize enjoyment of its benefits the invention is preferably practiced in conjunction with certain additional features or characteristics. In particular, advantageously the light source is a laser.

Also preferably the array produces an angular distribution $w(\theta)$ of energy, which is a desired distribution; and small height increments $\Delta y$ of lenslet surfaces in the array are shaped in relation to corresponding small angular increments $\Delta\theta$ by the relation $\Delta y/\Delta\theta = w(\theta)$. It is this fundamental capability to sculpt the lenslets in such a way as to produce virtually any desired angular distribution of the fan-beam energy that gives rise to the remarkable benefits enumerated just above.

It is further preferable that the surfaces be shaped by photolithography. Again here, as in regard to all the independent facets or aspects of the invention, this twelfth one is advantageously practiced in combination with others.

In preferred embodiments of a thirteenth major independent facet or aspect, the invention is a light-projection system that includes a light source. It also includes an array of lenslets receiving light from the source—and forming a fan-shaped beam of that light for projection.

The lenslets have refractive characteristics, as is commonplace with lenses generally. The array of lenslets, however, also has diffractive characteristics. According to this thirteenth aspect of the invention, the refractive and diffractive characteristics are matched for performance at specified projection angles.

Advantages of such matching, in relation to the earlier-presented limitations of prior-art systems, will now be self evident.

In preferred embodiments of yet a fourteenth major independent facet, the invention is a light-projection system. The system includes a high-power light source.

It also includes an array of negative cylindrical lenslets receiving light from the source and forming therefrom a fan-shaped beam of the light for projection toward such objects. The negative cylindrical lenslets form virtual line images, rather than real high-power images, of the source.

According to this fourteenth facet of the invention, air breakdown is avoided by absence of real high-power images of the source. Advantages of this aspect of the invention will immediately be plain to those skilled in the art.

Such benefits are not limited to the extremely high-power pulsed laser beams needed in large-scale top-down ocean surveillance or extended-range shallow-angle hazard monitoring, or aircraft-carrier operational aids, etc. discussed above. Rather they are potentially of value in any application requiring a very high illumination level emanating, as a concentrated fan beam, in an expanding geometry from a small source.

All of the foregoing operational principles and advantages of the present invention will be more fully appreciated upon consideration of the following detailed description, with reference to the appended drawings, of which:

BRIEF DESCRIPTION OF THE DRAWINGS

FIG. 7 is a representation of a dual display which is one form of informational output such as can be generated by apparatus of the present invention—the upper portion of the display representing a forward elevational view of a scene developed by the apparatus; and the lower portion representing a top plan view of the same scene, particularly as developed by a flying-spot form of the invention such as the previously described sixth aspect;

FIG. 8 is a like representation of an alternative to the lower portion of the FIG. 7, i. e. a top-plan view display such as developed by a fan-beam form of the invention;

FIG. 12 is an elevational side view generally like FIGS. 1 through 3, but showing another preferred embodiment of the invention as incorporated into an aircraft-carrier landing guidance system;

FIG. 13 is a set of three displays generated by the FIG. 12 embodiment for the information of aircraft-carrier operations personnel;

FIG. 19 is a flow chart representing a method of preparing a LIDAR system that corrects for refraction in LIDAR imaging through waves in a water surface;

DETAILED DESCRIPTION OF THE PREFERRED EMBODIMENTS

Figure 1:
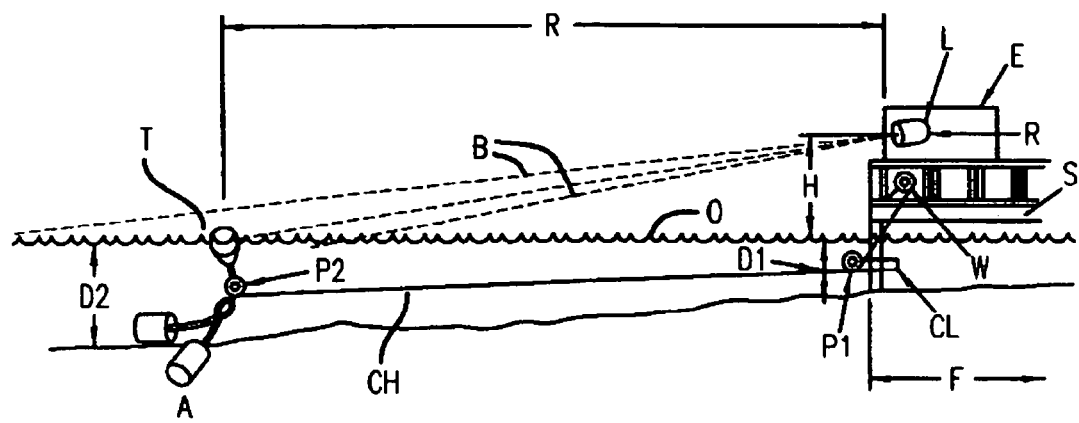
FIG. 1 is a side elevational diagram, after Anderson et al., showing a prior-art partly submerged stationary experimental deployment.
Figure 2:
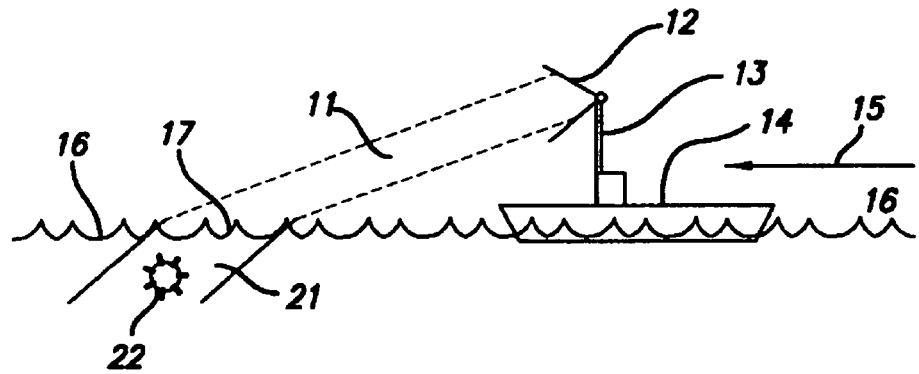
FIG. 2 is a like diagram but for one basic arrangement according to the present invention, and particularly for a water craft that is in motion.

1. Shallow-Angle Marine Observations Below the Horizon

Certain preferred embodiments of the invention use streaktube imaging LIDAR (or STIL) as a "ship shield". A LIDAR beam 11 is projected over the water and its return detected, by a forward-looking, low grazing angle LIDAR unit 12.

The LIDAR unit is mounted on a mast 13 of a water craft 14 that is in forward motion 15 along the water surface 16. Upon reaching the surface 16 the LIDAR beam is generally refracted to form a downward-propagating continuing beam 21 within the water.

The down-beam interacts with submerged (or floating) objects—thereby modifying the return beam. The system thus enables the water-craft operator to find and avoid mines and other obstacles, or to locate desired objects.

Preferably the emitted beam and the return-collection beam geometry both have the shape of a vertically thin fan. Such a beam provides a wide (left to right) detection swath and precise temporal resolution, for detection of even submerged targets while rejecting surface clutter. To achieve the latter objective, the use of a very thin fan beam is very desirable.

Theoretical analysis and scaling—from experimental data to a mast-mounted LIDAR—suggest that swath width in excess of 400 m, at ranges exceeding 500 m, is achievable with available technology. As noted above, it is contemplated to operate the present invention into the range of kilometers. The result is an important expansion of onboard threat avoidance for high-value assets—including civilian operations, as well as mine countermeasures and the like.

Figure 3:
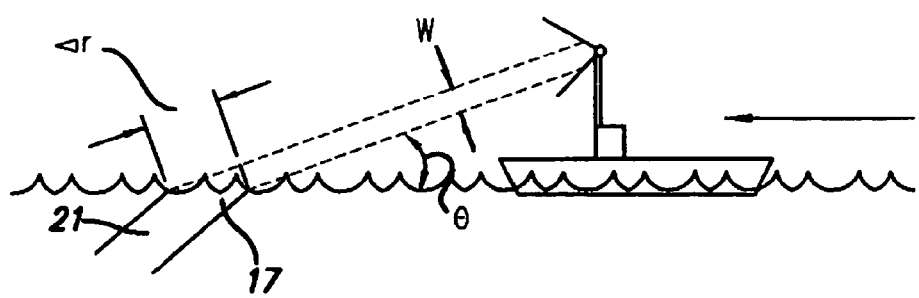
FIG. 3 is a like diagram, but enlarged, showing only geometrical relationships of a probe beam with the water surface.

Important figures of merit for grazing-incidence LIDAR may be called the differential time of arrival Δr (FIG. 3) and total ambiguity. The latter is a measure of overall spatial resolution for the system, in the direction of beam propagation.

The differential time of arrival Δr at the surface is actually not in units of time, but rather is a ranging uncertainty in terms of distance. It is found from the fan beam thickness w and the beam angle θ off the vertical, as $$\Delta r = w/\tan\theta,$$

and this is 11.4w at five-degree incidence. This uncertainty arises from inability of the system to discriminate between pulse return from the top and bottom edges of the outgoing beam.

Since this excess range occurs in both the transmission and reception paths, the total ambiguity is twice this value or 2w/tan θ, amounting to 22.8w at five degrees. It can now be appreciated that the spatial resolution is twenty-three times the beam thickness—more than an order of magnitude greater than the beam thickness.

Hence good spatial resolution demands an extremely shallow (thin) beam. For instance, to obtain a range ambiguity of 60 cm (two feet) the beam thickness must be only about 2½ cm (one inch).

From this discussion it can be appreciated that arrival time and hence spatial resolution are extremely sensitive to angle—proportional to 1/tan θ. The value of the angle θ, however, would be difficult to determine in absolute terms with high precision.

Because of this extreme sensitivity, approaches such as gated camera systems, which require a priori range information for setting of the timing, cannot work satisfactorily. That is, they cannot yield adequate resolution.

The present invention, by using a streak tube to time resolve the return, operates on a relative basis. Inherently therefore it is insensitive to variations in absolute angle θ or absolute arrival time.

Detecting objects such as mines calls for resolution of roughly 30 cm (one foot). To maintain this performance in the lateral direction as well as the range direction, a swath width of 400 m should map to about 1300 pixels. This value is readily accommodated by streak-tube geometry, which images along the axis of the fan beam.

The alternative scanning-spot system, using e. g. a single-pixel spot, would require a pulse repetition frequency 1300 times higher than the STIL system, and also requires the scanning capability and associated return-data processing. Nevertheless the scanning-spot facet of the invention does represent a viable alternative for at least some special conditions.

It is asserted earlier in this document that the fan beam rejects surface clutter. That statement is based on two factors:

(1) The surface specular return remains very tightly localized in the STIL image; therefore shallow targets are not obscured by the specular flash. Such obscuring can be a real problem with the logarithmic amplifiers or transient digitizers (or both) that are used in systems based on photomultiplier tubes.

(2) The STIL can actually form an image of the surface waves (from the precise range resolution). Therefore the invention further contemplates deterministic removal of subsurface target-image distortion, through using this surface information in conjunction with Snell's Law.

A gated camera approach (wide beams), as mentioned above will not serve well. The reason is the differential time of arrival—with respect to both the fore/aft dimension and the lateral (horizontal) dimension.

As to a scanning-spot system, the thinking behind the 1300-pixel figure mentioned above is that charge-coupled detectors (CCDs) are available in lengths up to 2048 pixels. Therefore the 1300-pixel figure is well within the capability of current technology.

Figure 4:
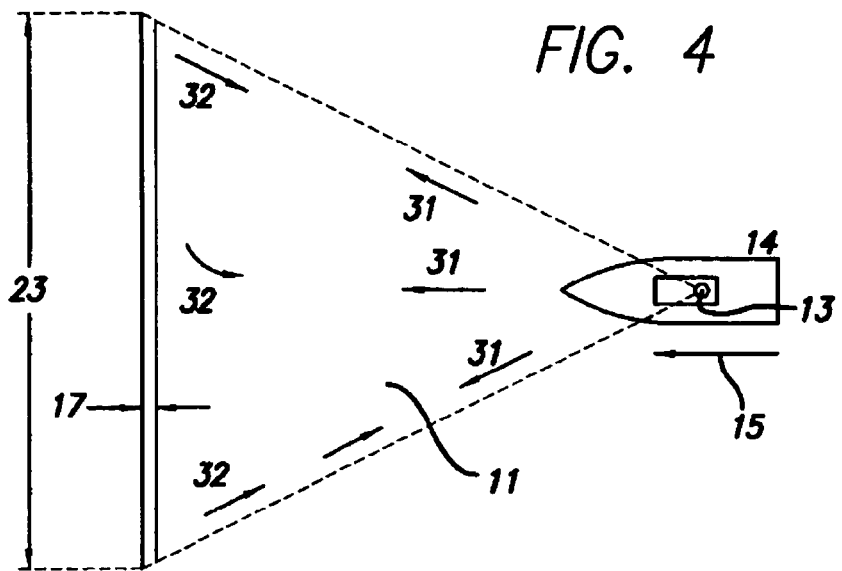
FIG. 4 is a corresponding plan view for the arrangement of FIGS. 1 and 2, particularly with a fan beam.
Figure 6:
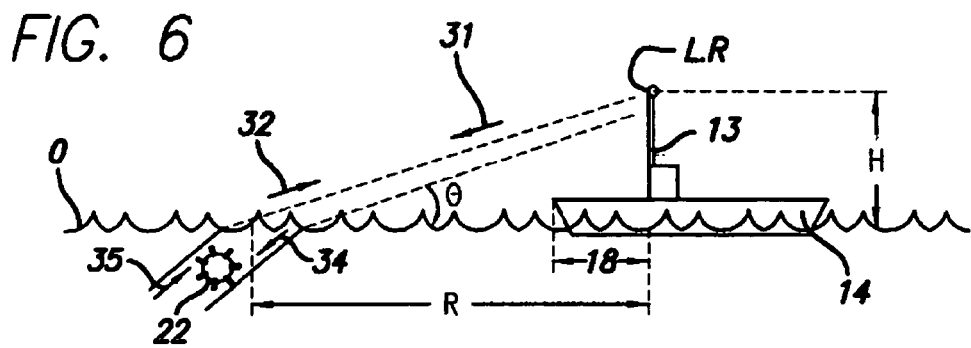
FIG. 6 is a diagram like FIG. 2 but somewhat less schematic and showing some key dimensions.

Accordingly, far preferable to either gated cameras or a spot scanner is a streak-tube imaging system, receiving data collected as in FIGS. 4 and 6. Here a planar fan beam 11 of projected light 31 leaves the mast 13 of a craft 14 that is traveling forward 15.

The beam 11, preferably 1¼ to 2½ cm (one-half to one inch) thick, intersects the water in a straight swath 17 that is thirty to sixty centimeters (one to two feet) "wide"—i. e., in the fore-to-aft direction relative to motion 15 of the craft 14. The transverse dimension 23 of the beam/water intersection 17 is about 400 m (1300 feet) "long"—i. e., in the lateral direction relative to motion 15 of the craft 14.

Naturally, because of irregularities in the water surface (and despite the geometrical precision of the laser beam) the intersection is not straight Precisely; its departures from precise rectilinearity vary with the weather, and other factors that affect the surface contours. The entire transverse dimension of the beam is reasonably uniform in energy density and is projected simultaneously. Return information from the wings (left and right corners) of the pattern, however, is reduced in intensity by virtue of the inverse radial dependence of energy in the diverging beam, in conjunction with the greater travel distance to the straight intersection 17 with the water surface. It is also retarded, due to the greater travel distance.

At the beam/water intersection swath 17, the beam is refracted by the water surface O (FIG. 6), continuing within the water as a down beam 34. Submerged objects 22 such as mines (and also turbidity of the water itself) form a return up beam 35, reverse-refracted to constitute a collected reflection beam 32 for detection at the receiver R.

In this system the round-trip time of flight to the surface flash yields horizontal range, while the round-trip relative time from the surface flash to the object yields depth of the object. The system thus yields range (very nearly equal to, and directly proportional to, exact horizontal range), bearing, and depth on each single shot—i. e. laser pulse.

From the foregoing, those skilled in the art will understand that objects floating at the surface may possibly be distinguished from the surface flash if they have a very greatly different reflectance than that of the water surface. If relatively larger, such objects may be more readily detected.

Attenuation and retardation at the wings tend to disrupt slightly the regularity of the display, making objects at the wings appear both darker and lower than objects at the same depth nearer the center. These irregularities can be compensated in various ways if desired.

The attenuation is advantageously compensated, as set forth later in this document, by an array of lenslets that sculpts the amplitude of the beam, redirecting energy from central portions of the outgoing and return fan beams to the wings. The retardation is best corrected by software in the image-analytical stage.

Figure 5:
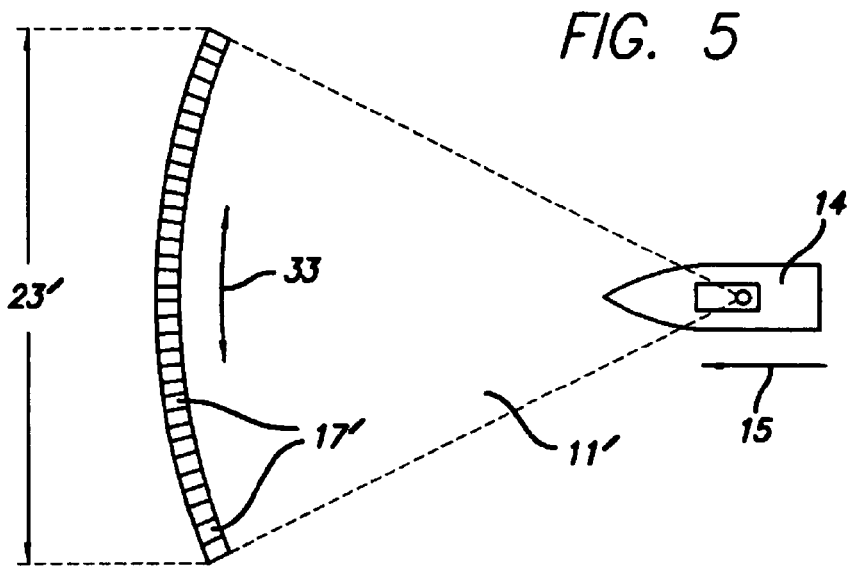
FIG. 5 is a like view but with a scanning spot.

The scanning-spot LIDAR system projects a beam 11' (FIG. 5) that is not fan shaped but instead is tightly constrained in the horizontal as well as vertical direction. The resulting individual spot or pixel 17' at the beam/water interface beam is swung back and forth 33 to produce a circular arc at the interface.

This system is not subject to the range-irregularity disruption just discussed; however, the additional electronics and optics for this form of the invention appear to render it somewhat less desirable. Such a flying-spot scanner could time resolve, but the system would be relatively complex.

For example, to achieve 30 cm (one foot) resolution over a swath of transverse length 23' equal to about 400 m (1300 feet) at ten knots would require a pulse repetition frequency of 400×3.28×5×3.28=21,320 Hz, which is quite a fast laser. The receiver would have to digitize each pulse at this high rate.

Such a system also requires a complex scanner with very high pointing stability to allow spatial reconstruction of these multiple pulses. Overall, it is a difficult technical challenge though possible, and the STIL system avoids all these difficulties by forming both range-azimuth and altitude-azimuth images (see discussion following) on each pulse, and time resolving by electrostatic sweep.

Exemplary numerical values for both forms of the invention include range R (FIG. 6) of about 500 m (1600 feet) and nominal vertical angle θ of about five degrees. The system works over a fairly wide range in vertical angles from the mast.

In variation of vertical angle θ, however, there is an important tradeoff. Smaller angles yield greater range but lower signal-to-noise ratio for subsurface detail.

This limitation is due to poor Fresnel transmission through the beam/water interface at small angles. Thus standoff range R can be traded off against detection depth.

Accordingly the five degrees (off horizontal) mentioned above is only illustrative, but offers a good compromise for a standoff range of operational utility. It will be appreciated that it is not sufficient merely to detect a mine or obstacle: what is required is to be able to stop or turn before striking it.

The mast height H is about 35 m (110 feet). The mast setback 18 from the bow may be about 80 m (250 feet).

With streak-tube display, generally as described in the Bowker and Lubard patents including U.S. Pat. No. 5,467, 122 (entirely incorporated by reference in this present document) on vertically excited streak-tube LIDAR imaging, return delay after the return instant of the surface flash is displayed as depth. This is also illustrated in FIGS. 7 and 8 of the present document.

The "forward view" 41—or in patent parlance "elevational view"—namely, the view as seen looking forward through the water, may be called an "altitude-azimuth view". It displays altitude or depth 43 vertically, and azimuth 44 to left and right, horizontally.

The complementary "plan view", or "top view", or "range-azimuth view" 48 (for the straight fan beam of FIG. 4) displays range 46 vertically, and azimuth 44—exactly matching the azimuth display at top of FIG. 7—to left and right. It is a view as taken from above the scene with the watercraft 114 at the bottom of the picture, and the present scan 41'—the altitude-azimuth view 41 compressed to an incremental strip of height 47—at the top of the picture.

Actually this plan view is computer-generated by vertical compression of many instances of the elevational view, and successive placement of those instances as an array 46 from bottom toward top of the screen.

In the flying-spot system, a range-azimuth view may appear as in the lower portion of FIG. 7. This type of view corresponds to that of FIG. 8 discussed above, except for the arc shape of each of the incremental slices 41", 46' formed from the vertically compressed altitude-azimuth views—again with the water craft 114' at the bottom of the view.

For successful implementation of the present invention it is necessary to deal with various practical issues including clutter from waves, whitecaps and the like; discrimination against kelp, fish and other waterborne interferants; and the determination of achievable combinations of swath width and standoff range.

As noted above, standoff range must be made adequate to enable stopping the water craft if an obstacle or mine is detected. Signal-to-noise ratio (SNR) and thus measurement precision are related to speed of the water craft.

This is an energy-density analysis: SNR is dependent upon energy returned from the target; if the craft moves more quickly, the energy density per pulse (for a fixed laser power) must be lower; thus the energy integrated over the target is smaller and SNR is lower.

Figure 9:
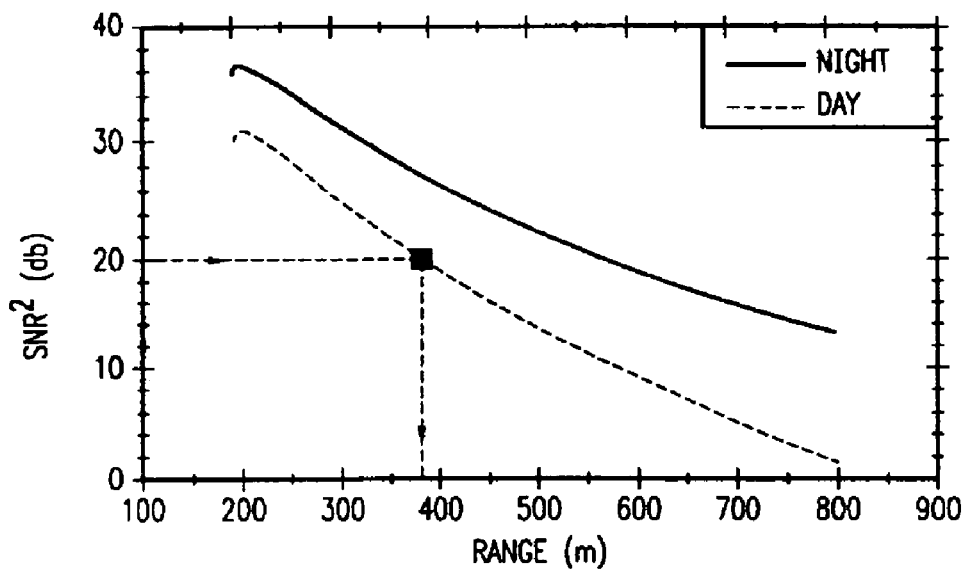
FIG. 9 is a graph showing exemplary performance estimates for both nighttime and daytime conditions—more particularly, the square of the signal-to-noise ratio (in dB) as a function of range (in meters) for a craft operating at ten knots, with a swath width of four hundred meters.

Signal-to-noise is also related to and overall angle of view; the data graphed in FIG. 9 are for ten knots, and a 400 m swath width. They suggest that the standoff range can be traded off against accuracy of imaging.

Solar background is an additional noise source that limits detectability. Thus the tradeoff is in any event more favorable at night, when interfering ambient light is minimal.

Figure 10:
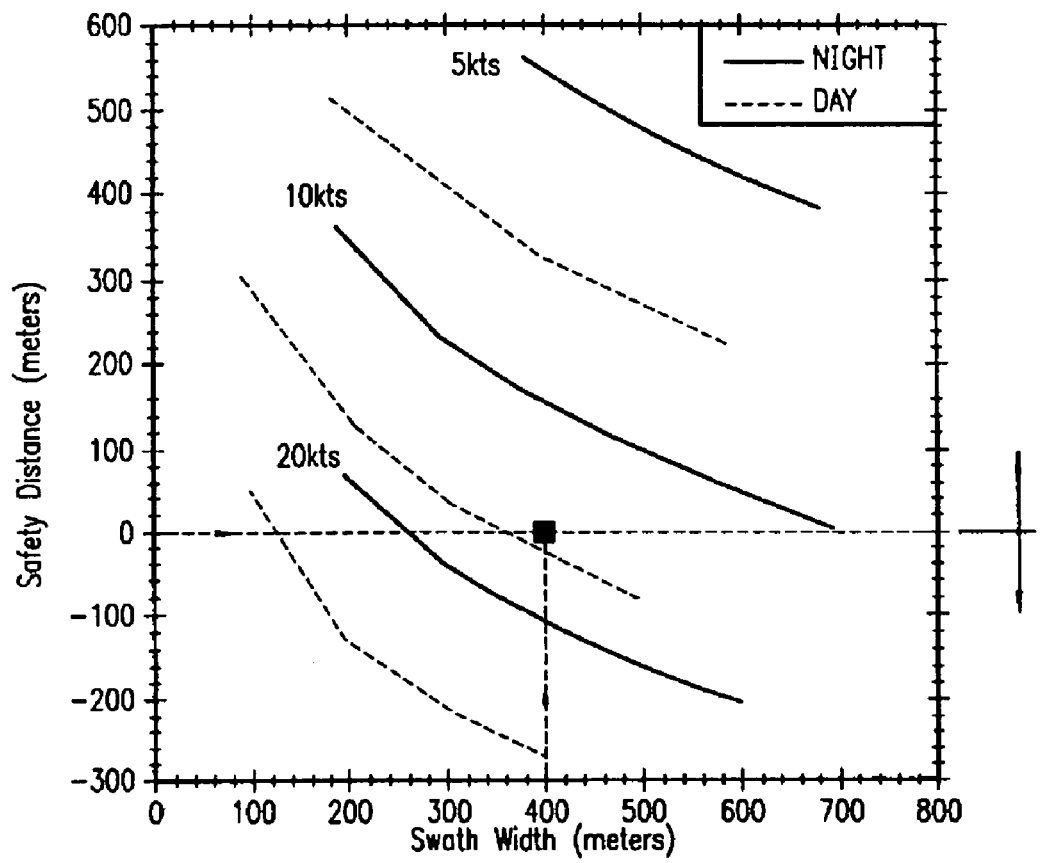
FIG. 10 is a graph showing safe operating distance as a function of swath width (both in meters), also for both night and day, and for three different craft velocities.

The nomograph of FIG. 10 takes into account two effects: if the craft moves more slowly, (1) detection can be at a greater range (from the SNR analysis above), and (2) the craft can stop in a shorter distance (thus providing a greater safety distance even if detection range were the same). Both these effects yield a greater standoff range at lower speeds.

The double-ended arrow at the right of the drawing summarizes the significance of the "safety distance" scale at the left. Positions 51 in the graph above the zerosafety-distance line are safe, whereas positions 52 below that line may entail possible contact with mines.

As shown, increased SNR at lower speeds can be traded for a greater swath width, and conversely where rather high speeds are needed. The utility of really narrow or wide swaths, however, is a matter for personnel controlling the craft to evaluate operationally.

Figure 11:
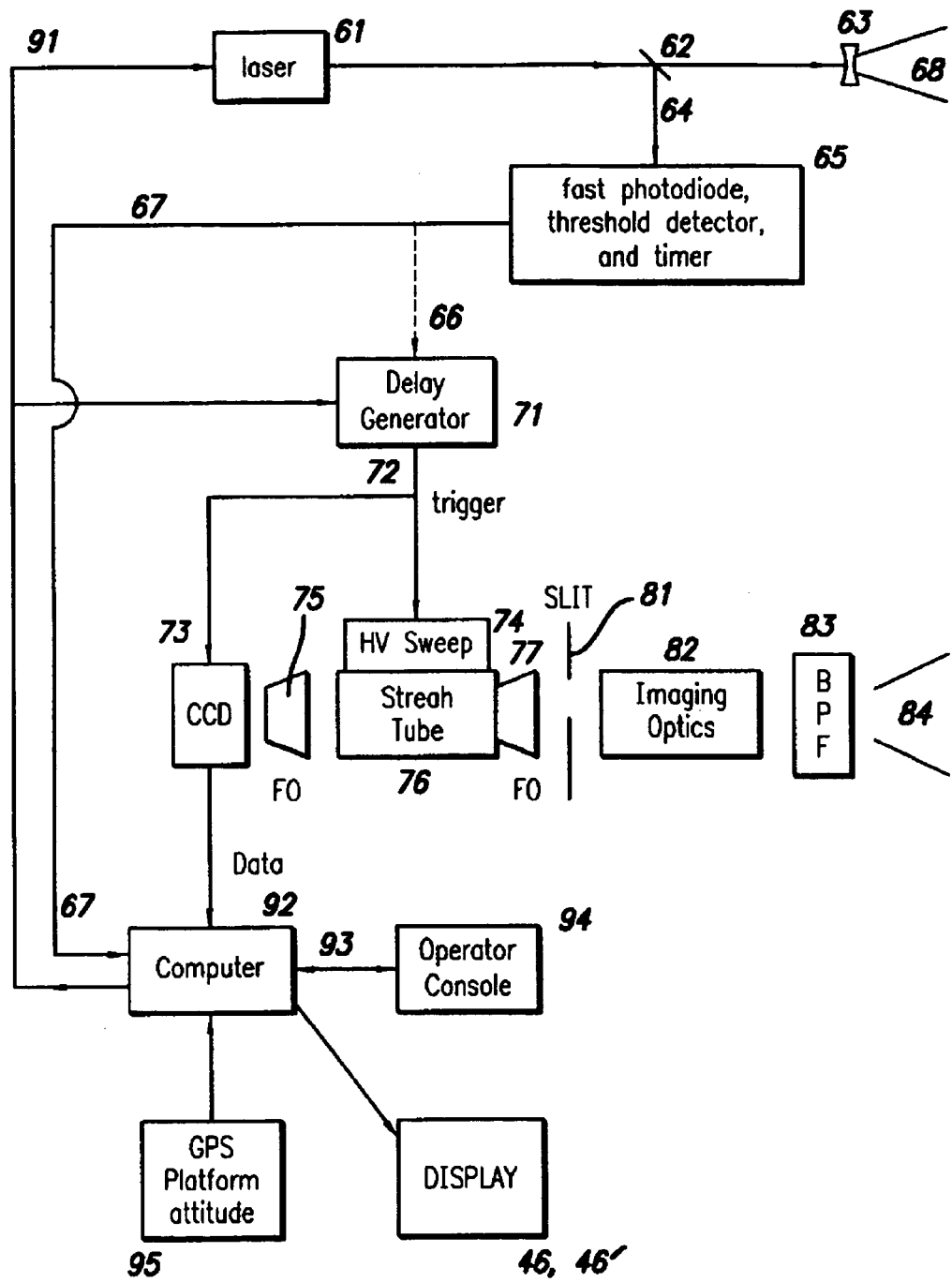
FIG. 11 is a block diagram of apparatus according to one preferred embodiment of the invention.

Upon operator command entered at a console 94 (FIG. 11), a computer 92 develops a control pulse 91 to fire the laser transmitter 61. The laser is advantageously a diode pumped solid state (Nd:YAG) unit transmitting in the bluegreen (532 nm).

A beam splitter 62 picks of a small (less than one percent) fraction of the transmitted pulse, which is sent 64 to a fast photodiode 65 for precise measurement of the time at which the pulse leaves the transmitter. The main portion of the beam passes through an anamorphic lens (diverging optic) 63 to form a fan beam 68; the beam remains collimated in the elevation axis.

The backscattered light 84 is imaged with a precisely coaligned receiver. The receiver optical train includes a bandpass filter (BPF) 83 to reject solar radiation.

A conventional imaging lens 82 focuses the scene onto a slit 81, whose width is chosen to match the width of the transmitted fan beam. The image at the slit is relayed by a first fiber optic (FO) 77 to the photocathode of the streak tube 76.

The fiber optic may be tapered, allowing a wider receiver aperture for increased collection efficiency. Another alternative is to use multiple receivers to span the fan beam; in this case each receiver could use a longer focal-length lens, and a larger aperture.

Within the streak tube 76, the electron beam is swept using a high-voltage ramp generator 74. This sweep is synchronized with the transmit time, using a programmable delay generator. The consequent range/azimuth image is formed on phosphor at the back (left, as illustrated) end of the streak tube.

A second fiber-optic coupling 75 relays the image to a CCD 73 for digitization and readout by the computer 92. The same computer preferably both acquires the data and performs system control.

Forward motion of the platform sweeps out the in-track dimension. By combining the returns from multiple laser shots with platform location from a Global Positioning System module 95, the returns may be spatially registered into geodetic coordinates—forming, if desired, a full three dimensional image of the scene in front of the ship.

The computer system includes automatic target detection algorithms to detect and precisely localize hazards to navigation. The operator display also preferably includes a scrolling map display 46', 46 (FIGS. 7 and 8), such as previously discussed, to provide situational awareness of the area in front of the ship.

In addition to utilization for mine detection, the grazing-incidence LIDAR can also be used for detection of floating debris (and other hazards to navigation), periscopes, cruise missiles and other threats. For the case of these exposed objects, the blue-green laser is preferably replaced with a near-IR laser (e. g., 1.54 microns) to provide eye-safe detection.

In such applications the fan beam can be projected at near-horizontal angles, resulting in considerably increased standoff ranges. In particular the standoff range will be controlled by the clear line of sight, which is ultimately limited by the curvature of the earth. Detection ranges of ten to twenty kilometers accordingly may be possible, depending upon transceiver height above the water. For the case of periscope and missile detection, the search area would include both sides and aft to cover a 360-degree search volume.

2. Aircraft-Carrier Operations

Another application of the mast-mounted LIDAR, as mentioned earlier, is as a landing aid for carrier operations. A forward-looking, eye-safe system would provide real-time measurement of the aircraft 122 (FIG. 12) relative to the aircraft carrier 114, and relative to the desired approach path, as well as range and range-rate to guide both pilot and controllers in an operations control center 118.

The additional range and range-rate data represent a considerable benefit for aircraft safety. In addition to aiding pilots in manned aircraft, the data from mast-mounted LIDAR units could be of considerable utility for unmanned air vehicle (UAV) operations.

The system includes a LIDAR transceiver 112 mounted to a mast 113 or directly to a tower on the carrier 114, and also includes a computer-controlled streak-tube module 117 disposed for viewing in the operations center 118. Controls of the computer are also advantageously disposed for use by the controllers there.

The radiated LIDAR pulses 131, like those discussed earlier in other may be in the form of a thin fan beam directed toward an expected or determined altitude of—for example—an incoming aircraft 122; if desired the fan beam may be scanned vertically to encompass a greater range of possible or permissible altitudes. As in earlier-discussed forms of the invention, if the beam is at at least some known (or approximately known) shallow angle to the vertical, the system is able to interpret the return delay in terms of altitude, as well as range, and so generate an elevational view as in FIG. 13(*b*).

Such a view may display an image 222 of the aircraft in relation to desired glide-path indicia. Such indicia may for example include a vertical line 261*h* representing a desired instantaneous horizontal position, taking into account the known range and calculated range-rate, i. e. velocity; and a horizontal line 261*v* representing a like desired vertical position.

As before, such instantaneous images can be compressed and accumulated to provide numerous strip-shaped slices 246 of a plan view, as in FIG. 13(*c*). This view, closely analogous to FIG. 8, shows an image 222 of the aircraft 122 in relation to an image 214 of the carrier 114—and may also show superposed indicia 261*h*, 261*v* as in FIG. 13(*b*), or alternatively may show safe glide-path boundaries 262.

If desired the system computer can also be programmed straightforwardly to assemble a side elevation which simulates the original scene of FIG. 12. This elevational view can be given various helpful characteristics, as for instance a glide-path indicium 261, and as illustrated a greatly expanded vertical scale—since safe landings are particularly sensitive to correct elevation of the aircraft relative to the carrier deck.

3. Observations Above the Horizon; Integrated Operation

As pointed out earlier, LIDAR is known to be useful for obtaining information about airborne objects. In terms of cost and space requirements, however, it is objectionable to provide a separate system for such purposes.

The present invention contemplates an integrated system for detecting both waterborne objects 322s, 322f (FIG. 14) and airborne objects 322a, 322b from a water craft 314. Here a LIDAR subsystem 312, which is mounted to the water craft, emits thin fan-beam light pulses 311z, 311a, 311b, 311n from above the water surface 316 toward submerged objects 322s or floating objects 322f, and also toward airborne objects 322a, 322b. The LIDAR subsystem 312 also detects reflected portions of the emitted pulses.

The LIDAR subsystem 312 includes a module 331 (FIG. 14A) which is the portion mounted well above water level to a mast, flying bridge etc. Although the laser beam in principle can be piped to the LIDAR module 331, that module more typically includes the transmitting laser 373 itself, with electronic control circuits 333-345 and power 372 for pulsing the laser.

Figure 14:
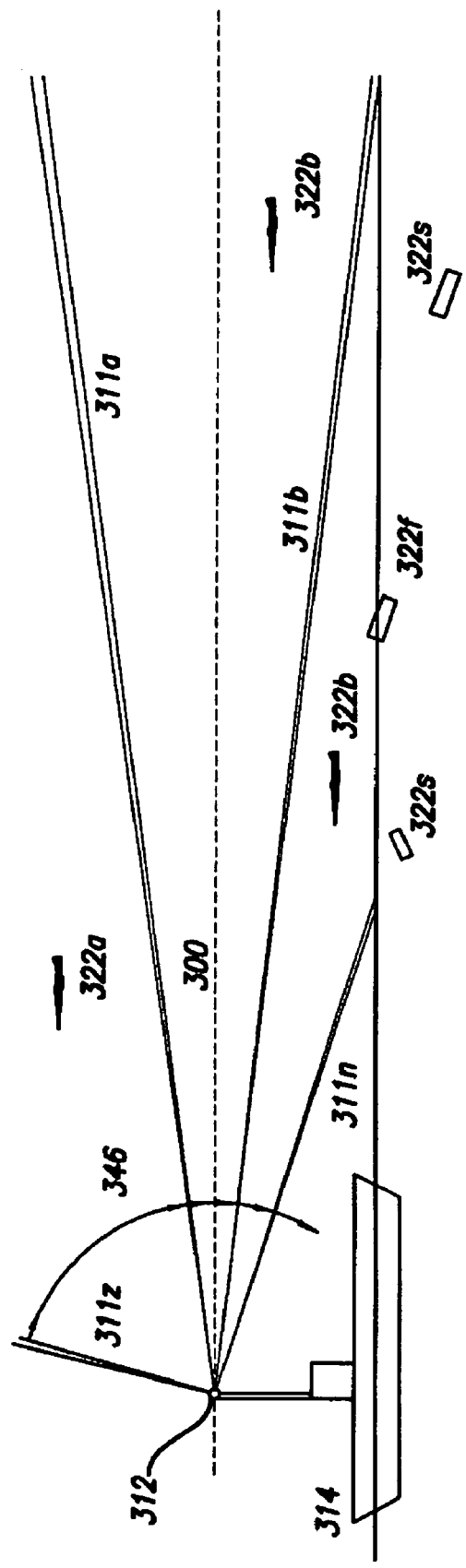
FIG. 14 is a view like FIG. 12 but showing another preferred embodiment as used in scanning a laterally extended fan beam vertically to locate both waterborne and airborne objects in at least one direction from a monitoring position.
Figure 14A:
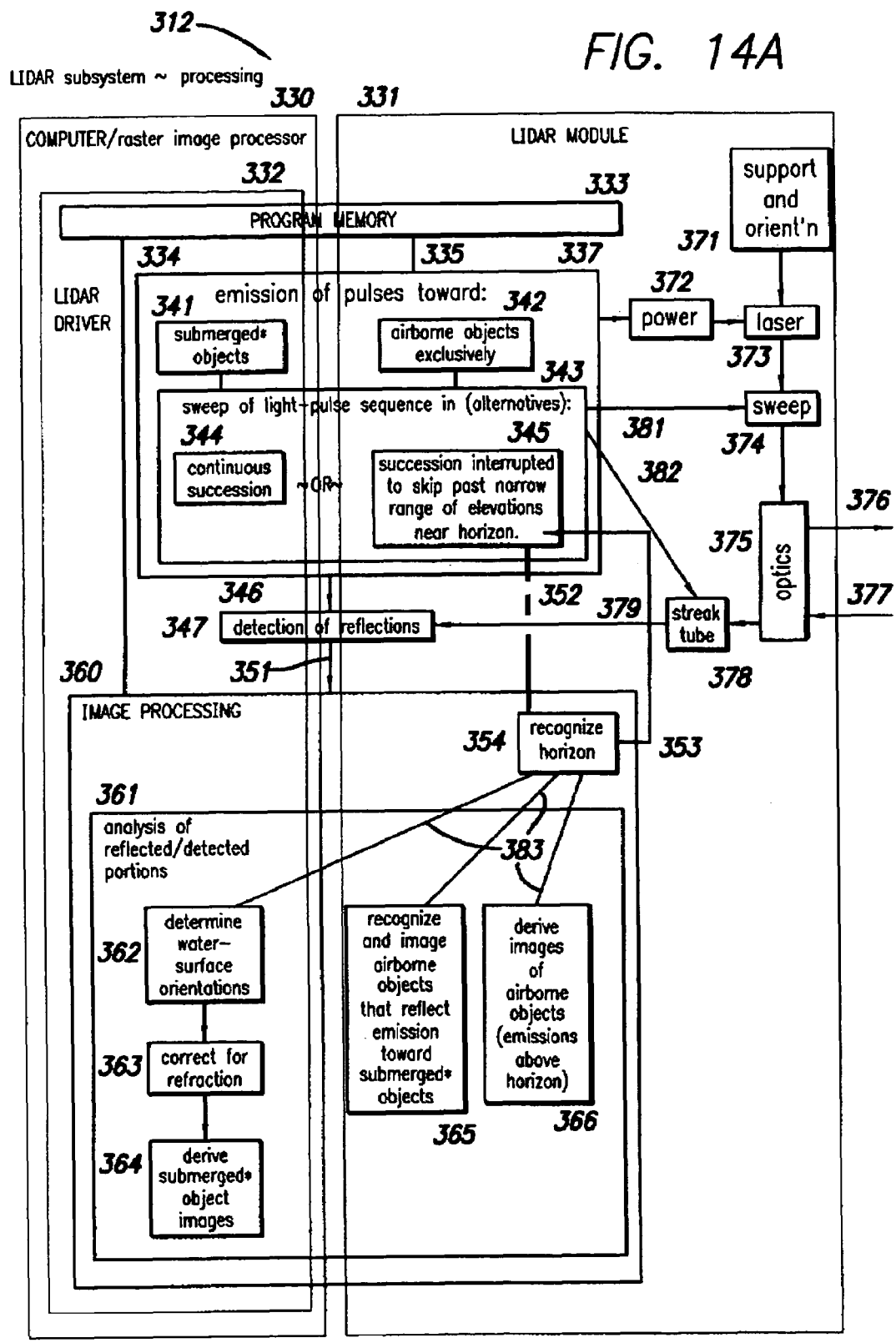
FIG. 14A is a highly schematic or conceptual block diagram showing a LIDAR subsystem (in two primary variants) for use in the FIG. 14 object-locating system.
Figure 15:
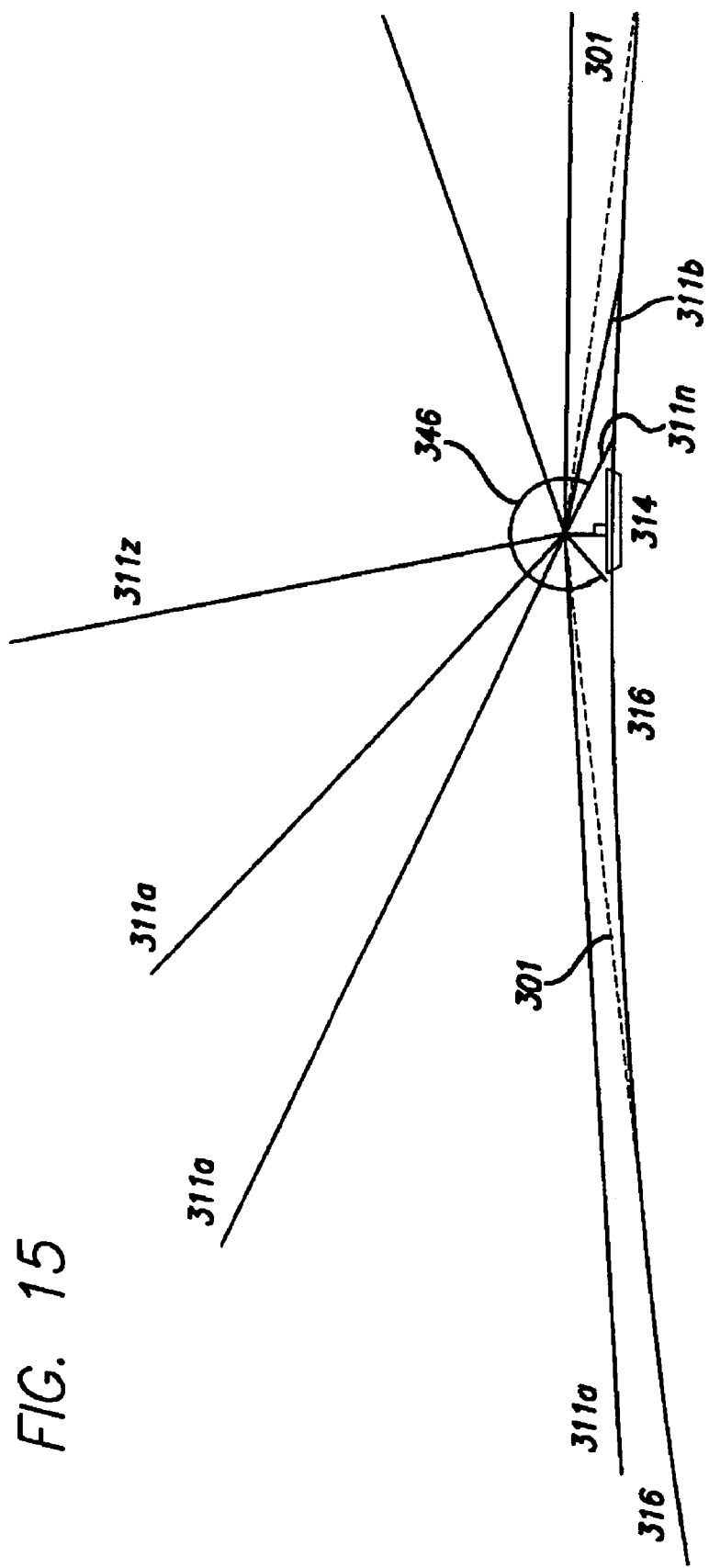
FIG. 15 is a view like FIG. 14 but at a smaller scale, to take into account the curvature (drawn exaggerated) of the ocean surface, and also showing the optional extension of such vertical scanning beyond the zenith to locate objects in two directions from the monitoring position.

Also included in the LIDAR module 331 are associated mechanical and optical components 371, 374, 375 devoted to support and orientation of the laser, sweep of its beam, and transmission of the swept beam 376 toward objects and regions of interest 322 (FIGS. 14, 15). Although the optics 375 may partially precede or encompass the beam sweep 374, for simplicity's sake the sweep 374 and optics 375 are shown as sequential.

For best coalignment of the return beam 377 with the emitted beam 376, the optics 375 preferably include the collecting and transmitting stages—integrated or at least intimately associated, as suggested in the drawing. Likewise for best performance the streak tube 378, for receiving the collected return beam 377, is advantageously also housed in the LIDAR module 331.

Adequate implementation in general is processing-intensive. Both pulse generation and data interpretation are performed in portions 330, 331 of one or more programmed processors that at present are typically digital electronic devices but may instead be implemented in optical circuits for greater throughput.

As the drawing indicates, the processing may be equivalently performed by dedicated firmware in a general-purpose processor, or by an application-specific integrated circuit (ASIC) 331 in the LIDAR module—or by software 332 operating in a processor that is part of a raster image processor (RIP) or general-purpose computer 330. In the latter case, the control software may be regarded as a "driver" for the LIDAR/streak-tube system.

A raster image processor is nowadays highly favored for managing (in a well-optimized manner) the intensive data massage typically associated with images—while relieving both the specialized hardware 331 and the general-purpose computer for other tasks. The diagram of FIG. 14A, by displaying all the processing functions as spread across both the computer/RIP block 330 and LIDAR module 331, is intended to convey that system implementers can distribute the processing as among ASIC, firmware and software as best suits performance, space constraints, efficiency and economics.

Programming for the LIDAR subsystem is preferably held in onboard memory 333 as discussed above, and supplied to (or in the case of an ASIC integrally incorporated in) 334, 335 the functional modules. A pulse/sweep control block 337 controls pulse power 372 for the laser 373, and also develops synchronized control signals 381, 382 for the laser sweep 374 and streak tube 378 (with its internal sweep).

The pulse and sweep processing 337 provides for emission of pulses toward both a region 341 in which submerged (or partially submerged) objects can exist—i. e., below the horizon—and also a region 342 in which exclusively airborne objects can be present, i. e. above the horizon. As shown within the sweep subblock 343, however, there are two fundamental alternatives for implementation of this part of the system: the continuous-succession function 344 or interrupted-succession function 345 will be taken up below.

The pulse and sweep timing and other parameters are passed 346 to the detection module 347, which receives data 379 from the streak tube 378—representative of the returned beam 377. The outputs of the detection module 347, namely detected-reflection data 351, proceed to the image processing block 360.

This latter block 360 may include a horizon-recognition function 354, which may be particularly critical if the horizon-interrupted-succession alternative 345 is operating. These two functions require coordination 352, and for best results may be subject to feedback servo control 353 from the recognition function 354 back to the horizonskip function 345.

The horizon-recognition function 354 is shown conceptually as encompassed within the image-processing block 360. In practice, however, for purposes the interrupted succession sweep function 345 the LIDAR subsystem may acquire horizon data from a separate data train that is not physically integrated into the illustrated primary optical componentry and possibly not even integrated into the main processors.

It should be noted, however, that a horizon-recognition function 354—at least one derived preliminarily from the optical returns themselves—is desirable even in the continuous-succession-sweep operating mode 344. This is because horizon information is needed to route data to the processing channels 362-366 discussed below.

The principal function within the image-processing block 360 is analysis 361 of the reflected and detected portions of the laser pulses. In substance three parallel processing channels 362-364, 365 and 366 can be recognized.

The first two of these operate separately upon the returns emitted toward the submerged, or partially submerged, objects—i. e., upon the return of laser pulses directed below the horizon. In the first channel, the goal is to derive images of submerged (or partly submerged) objects.

This goal requires preliminary determination 362 of water-surface orientations—based upon the same returns from the water, but upon the ranging component of those returns rather than the image content as such. The surface orientations in turn enable the overall system to develop a correction 363 for refractive distortion. Finally this refractive correction is applied to the image content to provide submerged-object images 364 with greatly reduced distortion.

At the same time the second channel 365 is able to determine whether any portion of the return from below-horizon laser pulses is airborne, rather than waterborne. This information too can be extracted from ranging data: a return that is greatly advanced relative to that from the highest waves must be above the surface.

The concept of "the highest wave" requires assumptions of at least some minimal degree of continuity in the wave surface. If it is desired to be able to discriminate waves from wave-skimming projectiles, determination of the highest wave—and recognition of airborne objects very near the highest wave—can be enhanced through dynamic analysis of the liquid surface, as well as dynamic analysis of the movement of candidate airborne objects.

As the diagram makes clear, the refractive correction 363 developed in the first processing channel 362-364 is omitted in the second channel 365.

In addition, the third channel 366 separately analyzes the reflected and detected portions of pulses emitted toward airborne objects exclusively—i. e., the return of pulses directed above the horizon. The objective here is again parallel, namely to derive airborne-object images from the detected pulse data.

In this part of the scene, however, as will be evident there can never be liquid-refractive distortion to account for. Therefore the image processing in this region must proceed differently—and more simply, without attempting to determine anything about any intervening surface. There is no need to apply either (1) any refractive correction or (2) any preliminary ranging or dynamic-motion analysis, for in this region there is no need to distinguish airborne from waterborne objects.

In one preferred embodiment of this system, preferably the LIDAR subsystem sweeps a sequence 311z-a-b-n (FIG. 14) of the light pulses across such submerged, or partially submerged, objects and such airborne objects in a substantially continuous succession. By "across" here it is intended to encompass use of a vertical sweep.

For instance, the sweep may proceed downward from a position 311z near the zenith, through the horizontal 300, toward and to the nearest desired location 311n to be monitored within the water; or instead upward from such a closest desired location 311n, past the horizontal 300 and onward to the near-zenith position 311z. A particularly preferred form of the sweep does both—i. e. upward from the closest desired location 311n (FIG. 15) in the water in one direction, to and past a zenith position 311z, and terminating at the closest desired water location in the other direction.

This embodiment does not attempt to skip over ocean regions just below the horizon (even though they are too remote for extraction of useful floating-object information from the return). This is accordingly the embodiment that is most highly preferred—for its simplicity in control of the outgoing pulses.

In particular, in addition to the absence of need for pulse interruption per se, the pulse-projection system need not be precisely controlled to allow for pitching of the water craft—which erratically displaces the system relative to the horizon. Instead, all accounting for the different spatial domains being explored can be performed after the fact, in an entry portion 354 of the analytical system as noted previously.

This portion of the analytical system locates the horizon. It then automatically switches 383 between the two analytical regimens 362-365 and 366 for signal returns originating below and above the horizon respectively.

At least a first approximation to locating the horizon 301 (FIGS. 14 and 15) can be obtained very simply from information about the known attitude of the LIDAR subsystem itself. Preferably, however, the analytical system is programmed to refine this information based on actual analysis 354 of the optical returns, for in general the emitted fan beam 311z, a, b, n is not accurately parallel to the horizon 301.

Despite the benefits of the continuous sweep 344 discussed above, the invention nevertheless encompasses another preferred embodiment also discussed above, though less highly preferred, in which the pulsing is interrupted 345 to skip past objects in a narrow range of elevations at and just below the horizon. In this case the sweep itself may also be made discontinuous, slewing more rapidly past the same region.

This embodiment 345 has an advantage: it avoids wasting time intervals in which the system can be receiving and processing real data. For either preferred embodiment if desired the entire LIDAR module 331—or the laser/optics elements 371, 373-376 and streak tube 378—may be mounted 371 in a gimbal box that is continuously servo controlled to hold the fan beam 311 accurately parallel to the horizon.

4. Overhead Marine Surveillance—Reducing Distortion

Use of airplanes and helicopters to detect and classify obstacles or weapons in the sea are significantly enhanced by an airborne LIDAR system according to the present invention. Certain preferred embodiments of this invention can provide undistorted, or less distorted, images of underwater objects when looking through the ocean surface from above.

Correct classification of objects, and in particular fewer false alarms, result from capturing both the distorted image of the underwater object and the shape of the ocean surface above that object. With the measured ocean surface map, image-distorting effects at the ocean surface can be removed from the image (without any a priori knowledge of the target) by image-reconstruction algorithms.

In addition, the surface map contains an image of the surface. Using this image, the system can directly identify whitecaps and other surface phenomena that are a significant source of false alarms.

The invention encompasses surface-finding algorithms that are used to generate the ocean surface map. The surface-mapping algorithm can itself be tested using existing streak-tube LIDAR data, associated with known surface characteristics.

The invention can also produce an accurate area-coverage estimate at different depths, i. e., a measurement of how well—how uniformly—the system is illuminating and imaging each water layer. The previously mentioned gaps in coverage, due to wave focusing and defocusing of probe rays, can now be estimated with much greater precision as to both size and number, and deterministic feedback thereby derived for the system operators.

As suggested above, the present invention includes a subsurface-image reconstruction algorithm. This algorithm can be modeled to determine what spatial sampling and signal-to-noise ratio (SNR) are needed to enable improvement of the images in any given environment—combination of weather, water type, etc.

Ideally, in any new system according to the invention, specification and fabrication of optics necessary to meet the requirements for spatial sampling and SNR are defined from the modeling efforts. The optics are then straightforwardly integrated with an existing streak-tube LIDAR system such as those provided by Arete Associates, of Sherman Oaks, Calif.

Ocean flights can then be performed over actual or (if further validation is desired) realistic simulations of marine obstacles or weapons, and the image-reconstruction algorithm used to correct the images. In accordance with the invention, performance—rather willy-nilly in prior-art systems—now conforms deterministically to the desired characteristics built into the system by virtue of the advance modeling.

Figure 16:
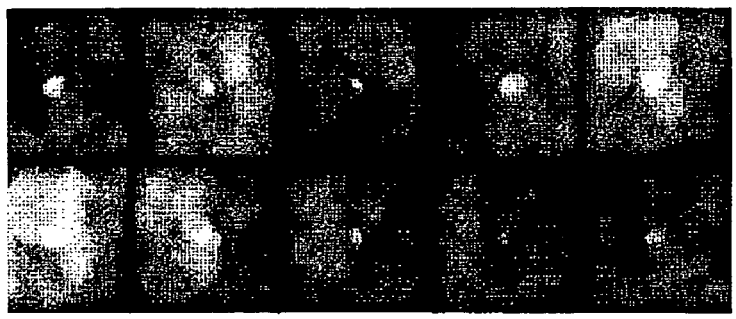
FIG. 16 is a set of simulated images of a submerged object as imaged through ocean wave surfaces having various characteristics such as occur within a span of 15 seconds, the actual size of the object being shown as a white circle in the upper left image, and the parameters used in the simulation being: sea state 2-3, water Jerlov IB (very clear), object at depth 10 m (38 feet) with diameter 1 m (35 inch) and reflectivity 8%.

Ocean surface estimation and underwater image reconstruction—More specifically, prior airborne LIDAR systems, have demonstrated that considerable degradation of images (FIG. 16) of objects, including small targets such as submerged weapons, can occur due to the distorting effects of the ocean surface. This distortion can degrade the probability of detection and classification, as well as the ability to reject false alarms.

The illustration represents a sequence of simulated images of an object with wave distortion. The actual size of the object is shown as a white circle in the upper-left image.

This series of views represents changes that occur in such an image in less than fifteen seconds. Parameters for this illustration included sea state 2 to 3, water Jerlov IB (very clear), object diameter approximately one meter (35 inches) and reflectivity eight percent, at depth of ten meters (33 feet).

Algorithms for reconstructing images distorted by ocean waves have already been developed and demonstrated by others. Deleterious effects of such distortions can be nearly eliminated, given knowledge of the ocean surface position.

With existing airborne LIDAR systems, however, it is extremely difficult to capture ocean-surface height data that can be utilized for such reconstructions. Time-resolved detectors may have adequate range resolution, but have very poor spatial resolution, while the converse is true for range-gated camera systems. A streak-tube based LIDAR system can collect both the spatial and range data at resolutions necessary to perform the reconstruction.

When a streak-tube system is used in an airborne LIDAR configuration, preferably the pulsed laser-transmitter light is spread into a wide-angle fan beam that forms a line image in the water. The streak-tube receiver has the ability to capture this line image every nanosecond (or faster) up to 1,024 times for a single laser pulse (with spatial sampling of up to 1,024 pixels).

Thus the streak-tube LIDAR system can measure the reflected light from the transmitter pulse every 15 cm (six inches) in air, or—allowing for the different refractive index—11 cm (4.4 inches) in water. Reliable performance of subpixel localization in range to less than 2½ cm (one inch) has been demonstrated on underwater targets.

All this means that the streak tube can accurately characterize the height of the ocean, with the resolution necessary to meaningful image reconstruction. Naturally the system not only measures the ocean surface but also simultaneously images underwater objects.

In addition to image-distorting effects, unfortunately ocean waves also redistribute the light transmitted from—and also back to—an airborne system, creating gaps in coverage where there is no or little illumination. Return from such regions is concomitantly absent or poor.

Not only is lighting deficient in the first instance, but in addition the same optical detours that misdirect incident illumination also deter what little light does enter such regions from finding a path back to the apparatus. Since the reflection is complete—at the speed of light —within microseconds of the illumination, and water waves do not move significantly within such short time intervals, both paths are disturbed by substantially the same pattern of ocean waves.

Figure 17:
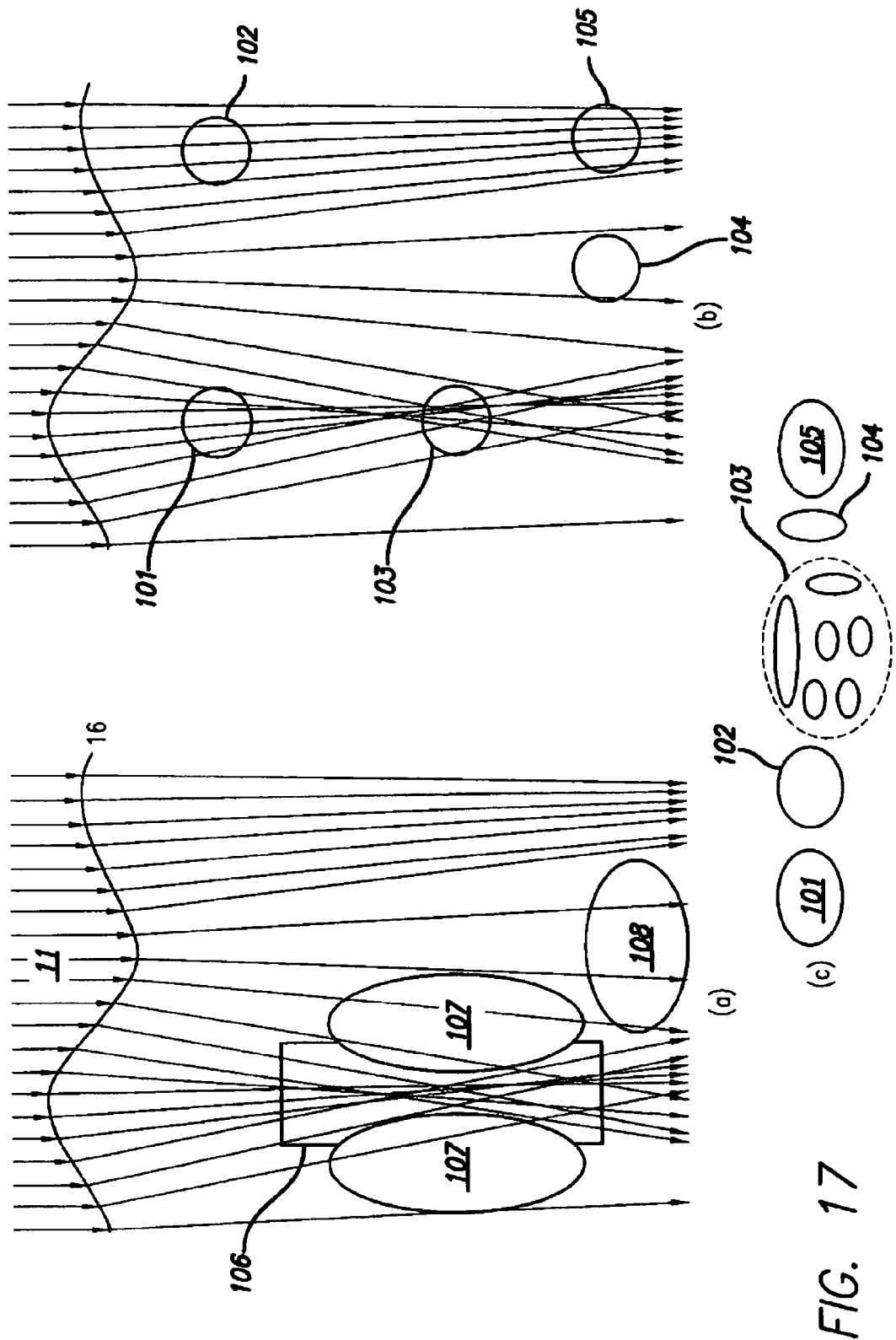
FIG. 17 is a set of related diagrams showing several ways in which ocean waves disrupt LIDAR imaging of submerged objects from above the wave surface, views (a) and (b) being coordinated elevations respectively showing distortion zones and objects positioned relative to those zones, and view (c) being a top plan coordinated with view (b)

These effects are shown conceptually in FIG. 17. Here view (a) shows the zones where LIDAR data is degraded due to illumination gaps 107 intimately adjoining a crest focus region 106—or ray mixing in the crest focus region 106 itself (to which rays from the gaps 107 are redirected), or ray separation in a crest defocus region 108.

View (b) shows several hypothetical, potentially detectable articles 101-105 positioned in relation to the identified regions in view (a). View (c) shows the corresponding images 101'-105' seen from an airborne system for each of those numbered articles 101-105 respectively.

As the drawing shows, objects 101 in the converging ray region above the crest focus 106 produce distorted images 101'. As shown, these ordinarily appear enlarged along the dimension or dimensions of the ray convergence.

The same is true of objects 105 near a lower crest focus (not illustrated, off the bottom of view [b])—even though the rays are not converging strongly, and although objects 102 in higher, near-surface regions of the same rays with the same only-moderate convergence yield reasonably accurate images 102'.

Objects 103 in or immediately below the crest focus may form broken-up image fragments 103'. Objects 104 in regions of strongly diverging rays form images—if at all —that are reduced along the direction or directions of ray divergence.

As will now be clear, a given object may produce an image that is in principle enlarged in one direction but reduced, fragmented or even totally absent in another. Analogous results are obtained from a mast-mounted system.

As noted earlier in this document, current airborne LIDAR systems have no capacity to detect or correct for these problems. This failing can be regarded as dual:

(1) the basic problem of image distortion itself, which can be greatly improved by image reconstruction in accordance with the present invention, and
(2) gaps and regions 107, 108 of low SNR, which the present invention cannot eliminate.

As to the second category, after a single LIDAR pass over the ocean surface, data for the corresponding zones 107, 108 is simply missing or inadequate. It is important to recognize that the missing data are missing physically, and cannot be supplied by any mere stratagem of mathematics, data analysis or information recovery.

Filling in these gaps or near-gaps, in turn, unavoidably requires multiple passes over the same area; this is the only way to obtain full coverage. What the present invention can do, however, is characterize and statistically quantify the gaps.

Figure 18:
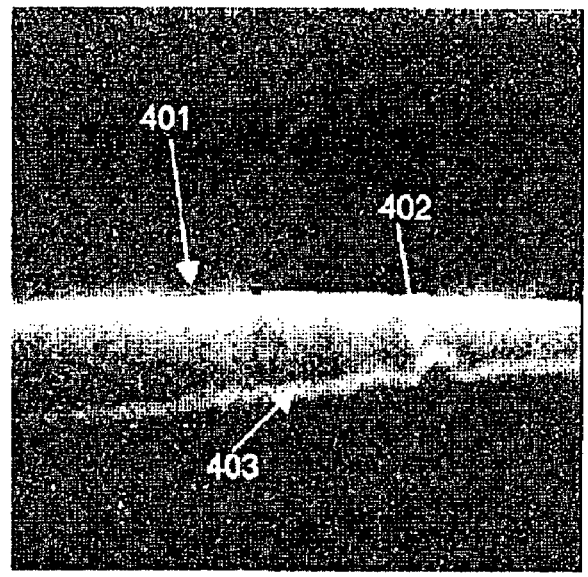
FIG. 18 is a single streak-tube LIDAR frame taken from above the wave surface.

The result is a measurement of specifically how many passes should be made, under the particular circumstances of sea state, water type, bottom depth etc. This innovative measurement is near-deterministic—namely, systematic and with a firm statistical basis, FIG. 18 shows a single frame of STIL data in which both the ocean surface 401 and the bottom are visible. This frame shows the strong signatures 401, 404 from the water surface and water volume respectively, as well as the return 403 from the bottom. The evident confusion as between these two components will be discussed shortly. (The seeming curvature in the surface is caused by the increase in lateral range due to larger nadir angles.)

The water surface is shown overexposed. The 30 to 60 cm (one- to two-foot) variation of the waves is difficult to see visually, as can be appreciated from the smallness of the coral head signature 402—the coral structure itself actually being almost 4 m (12 feet) tall.

Nevertheless the wave variation can be retrieved in data analysis. In fact, surface localization—as well as the underwater localization mentioned above—in range to 2½ cm (one inch) has been demonstrated with similar ocean data.

By measuring and reconstructing the surface, and by measuring the position and depth of the light reflected from the target in the distorted image, the undistorted object can be reconstructed. In addition to the improvement in imaging, detection and classification, this surface detection and mapping capability as noted above has other advantages: (1) coverage estimate at depth, (2) direct sea-state measurement, and (3) false-alarm mitigation.

Coverage estimate at depth: Because the system reconstructs the surface, the positions of absent data or low-SNR gaps 107, 108 (FIG. 17) are deterministically known in all three dimensions.

Again, this does not mean that it is possible to know what was in those gaps, but the system can provide a precise measurement of how much of the water volume was sampled at appropriate SNR. Thus, the requirement for additional passes over an area can be quantitatively defined by the sensor itself, as opposed to depending on model-based statistical coverage estimates, which in turn is dependent on an estimate of the sea state.

Direct sea-state measurement: The streak-tube system can make a direct measurement of the sea state. These data can be provided to all involved parties that are dependent on this— ranging from amphibious landing forces to recreational small-boat operators.

False-alarm mitigation: The system can also make an image of the surface. This image can bemused to examine surface objects, such as whitecaps, that sometimes resemble weapons and thereby represent a significant source of false alarms in existing LIDAR systems.

Best mode of practicing the invention—As the foregoing discussions suggest, ideal results in the practice of the present invention dictate that system implementers follow a regimen generally structured with these stages:

(1) modeling and simulation 611-618, 623-625 of the image-reconstruction and surface-mapping algorithms which the implementers intend to use, to verify their performance;
(2) adaptation 621 of existing streak-tube LIDAR hardware to meet the resolution requirements; and (3) ocean flight tests 626-628 over realistic targets to confirm actual performance in the field.

Those skilled in this art will appreciate that the first two stages may be started at the same time. In due course, however, the completion of the hardware adaptation 621—i. e., the second stage—should be deferred until system resolution specifications have been well established through the resolution-determining simulations 611-616, and preferably also the robustness validation 617-618, in the first stage.

Algorithm modeling and simulation—Ocean-optics simulation 611 should be employed first to create distorted images (FIG. 16) of well-defined underwater target surfaces. In this effort it is critical to provide not only simple, straightforward surfaces and viewing conditions but also a variety of more-challenging combinations of simulated target and simulated environment.

For example, it is advisable to create distorted images for different sea states, water clarity, target depths, and sensor noise. (Once the algorithm is operational, as noted earlier its robustness should be determined 617 through varying the spatial resolution of the surface map and the amount of noise.)

Such methodology stretches out the figures of merit for simulated system performance over a range of values. The relationship between system performances under various conditions can then be studied and understood most meaningfully. The reconstruction algorithm can then be run and evaluated 615-616 very objectively, since the well-defined input (from 611) to the image simulator can be compared 616 directly with the output from the reconstruction.

The robustness validation at 617 determines the effects upon the output image of variation in resolution and noise in the assumed surface map. Rigorous subjection of the system to and beyond known real-life extremes of sea surface condition is essential at this point.

The image-reconstruction algorithm itself need not follow any specific form, other than a systematic application 614 of Snell's law in tracing of rays through the visible water surface to correctly define the positions of objects with the confusing effects of the water surface removed. A satisfactory starting point 613 for the algorithm is any of the operationally sound prior-art algorithms (see discussions following), modified in a straightforward way to perform these ray tracings.

This effort can be guided by the principles set forth in the previously mentioned patent U.S. Pat. No. 5,528,493, for observation of vessels and landmarks from a submerged station, as well as other technical literature that is discussed below. A pivotal difference, however, is that for present purposes it is not necessary to at first crudely estimate and then iteratively, dynamically refine a mathematical representation of the instantaneous sea surface.

Instead, as pointed out earlier, that surface is simply measured directly by ranging at each pixel—and it is this capability which is the object of the second-algorithm development 623. Therefore all the iterative dynamic-development portions of the process discussed in the '493 patent may be simply omitted 624 from the algorithm used in the present invention.

With the second algorithm specified 623 and coded, it is verified 625, as described above, against a known surface used in this simulation. This later validation should confirm the insensitivity of the system to spatial resolution and noise in the surface-position estimate, previously verified through variation 617-618 in verification of the first algorithm.

The latter portions of at least the first-algorithm modeling are then, as illustrated, used to derive 621 the resolution requirements for the hardware. Further benefit, however, can be obtained by working through the second, surface-mapping algorithm development 623-625 before finalizing the optical specifications.

Development 623 of the surface-mapping algorithm too can be based on prior working systems (see discussion below)—but omitting the surface-determination iterations needed in those earlier efforts. This second algorithm can be tested 625 preliminarily using existing STIL data collected for an ocean patch, but eventually should be cross compared 626, 628 using measurement of at least a small surface that is independently known.

Hardware adaptation—To test the surface reconstruction algorithm an existing streak-tube LIDAR system is best employed. The only hardware likely to require modification 621 is the optical system for the transmitter and receiver, to provide the necessary spatial resolution on the water surface. Given the resolution specification, these optics in turn are straightforwardly specified, fabricated and integrated with the otherwise-conventional hardware.

Flight performance verification—The streak-tube LIDAR system is compact and lightweight, and readily mounted in an aircraft—a small fixed-wing aircraft is entirely adequate. The system is then flown 626 over the ocean, preferably near a coastline where varying benthic depth can provide many naturally occurring test characteristics.

Because it is difficult to get good "ground truth" on the ocean surface height, it is helpful to place 627 known test objects in the water at different, but well-surveyed or otherwise well-defined, depths. One kind of target advantageously included in such tests is a large grid structure, preferably at least roughly six meters (twenty feet) in each direction.

If desired to more directly test the surface-mapping stage, as noted above an artificial strongly contoured surface may be constructed and emplaced 628 the LIDAR system flown over that surface—i. e., with the surface exposed in the air. The ability of the system to measure and reconstruct the surface is estimated from the quality of the reconstructed object images.

Development benchmarks—It may be appropriate to regard a skilled person in this field as a senior technician in the several specialties required to specify, build and implement the invention—or, more properly, a team of such specialized technicians. In order to enable such a hypothetical team to practice the invention, extensive detailed practical instruction believed to be at senior technician level is incorporated into this document.

In following the guidelines described above, it is important to recognize that certain performance elements are key. Careful attention should be devoted to these two key elements:

being certain that the ocean-surface map created from the airborne STIL data is accurate, and being certain that the spatial resolution that is specified into the system is adequate, when used to create the surface map, to yield satisfactory images of submerged objects.

As will now be clear, a system may be put into operation but may not perform satisfactorily even though it creates a surface map, and even if the map is accurate, if the system does not adequately resolve adjacent elements of the ocean surface—or resolve the continuum of heights of the surface. The measured positions and heights are inserted into the ray tracing function, and the only real test of their adequacy is whether the ray tracing produces correct pictures of submerged objects.

Conversely, even if an operating system gives higspatial resolution in all three dimensions, if the measurements in those dimensions are imprecise or inaccurate then again the ray-tracing results will be deficient. For these reasons, adherence to the three-stage schedule prescribed above is important to achievement of satisfactory performance—without iteration of major specification steps.

Secondarily, the surface-finding algorithm should be robust, as variations in both atmospheric and ocean conditions can be extreme. The goal is nearly distortion-free images over as much as possible of the full range of such conditions.

Some additional advanced technical hurdles, and their solutions, are detailed below.

Creating the ocean surface map—Although correction for refractive distortion in airborne marine surveillance has not been attempted heretofore, some related fields of study have produced useful data. For example robust algorithms are known for finding the location of Lambertian surfaces (i. e., surfaces that scatter light in all directions, such as sand and dirt).

The ocean surface, however, is unlike these surfaces. In particular, it is a specular reflector, which leads to large variations of the returned light 401 (FIG. 21) depending on the angle of a wave—or elemental surface portions of a wave—with respect to the incident light.

In addition to this specular reflectance 401, the ocean reflects light 404 from the molecules and particles within the volume (i. e., water volume backscatter). The specular return 401, called "glints", can vary over several orders of magnitude and can be either much larger or much smaller than the volume backscatter return 404.

Figure 20:
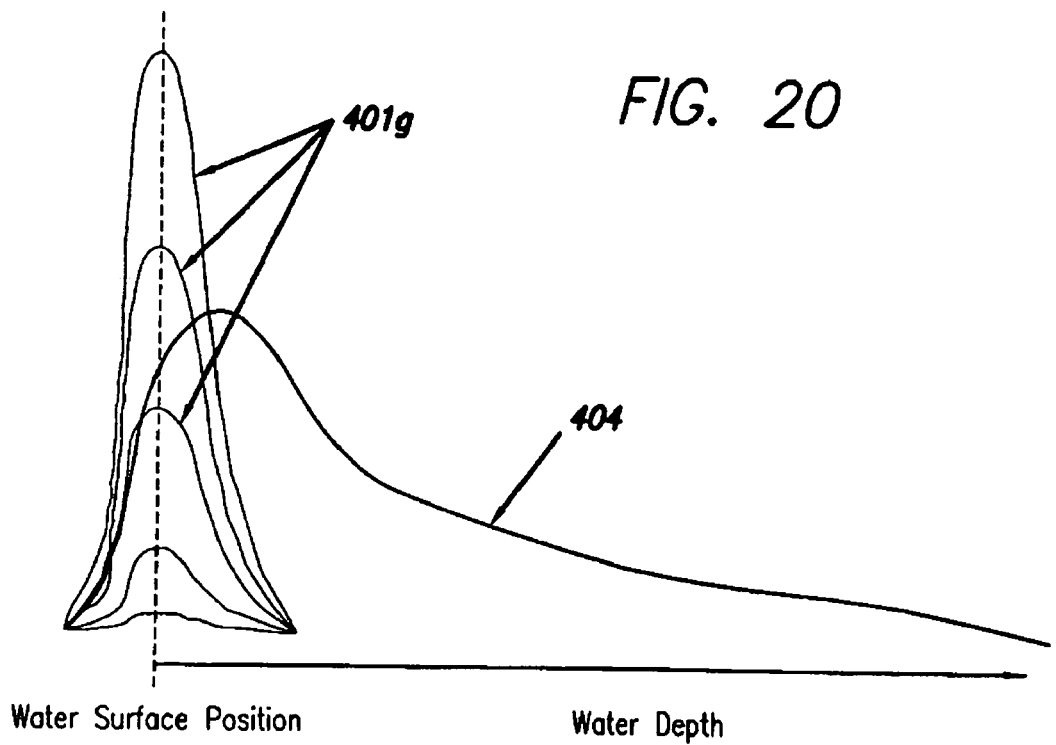
FIG. 20 is a graph of light return versus depth for both water-volume backscatter and water-surface glints.

The difficulty that these two different returns cause in estimating the surface position is that the volume backscatter return 404 reaches its peak value (FIG. 20) only after the laser pulse is entirely within the water volume, while the glint signal 401 reaches its peak when the peak of the pulse arrives at the water surface (see FIG. 20).

The distance between these two peaks 401, 404 is on the order of the width of the laser pulse. This width, for a typical 4- to 5-nanosecond laser, corresponds to more than a half meter (20 inches) in position difference.

This is uncertainty in ocean-surface position at each point in the field of view—not merely the uncertainty in position of a submerged object. Considered as an indeterminacy in individual surface-height values, a half meter is a huge distance. Such uncertainty would render futile any effort to establish a surface-height map for use in reconstructing undersea images.

Fortunately the data and exploratory algorithms developed by Guenther's group, mentioned earlier, can be used in generating a robust surface-finding algorithm able to differentiate between glints and volume backscatter. The generated algorithm can provide a good surface map from each laser pulse, or each succession of pulses.

Figure 21:
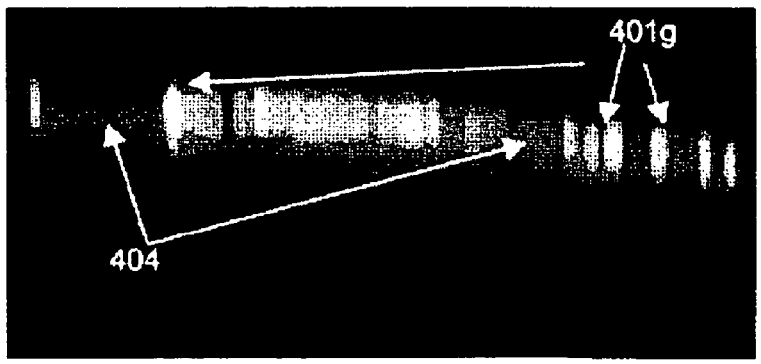
FIG. 21 is a view like FIG. 18 but enlarged to show a small section of a typical ocean-surface return, and particularly showing glints and volume backscatter separately.

The resultant surface-mapping algorithm is then best applied to existing STIL data taken during other tests. These data (e. g. FIG. 21) have relatively coarse resolution, 15 to 60 cm (6" to 2') per pixel, and no reference for ground truth. Nevertheless, working with these data provides good insight into discrimination of volume backscatter from glint.

To demonstrate that an area coverage rate adequate for a fleet system is achievable, adequate spatial resolution for performing image reconstruction must be maintained while both imaging a reasonably wide swath and holding a reasonable airspeed. These constraints must be added to those based on the previously mentioned requirements developed from the modeling, for specification and fabrication of the optical system.

Creating undistorted images—In the previously mentioned U.S. Pat. No. 5,528,493, the above-surface scene is reconstructed iteratively, starting from assumptions about some reference object such as the sun. Analogously in the work of Schmalz, as noted earlier the subsurface image is reconstructed in an iterative fashion, starting with assumptions about the depth of the object.

Thus, as suggested in the discussion of related art, what might be called "the trick" is in knowing the instantaneous shape of a distorting surface that is constantly changing. This perpetual shifting or moving is what leads to the requirement for iteration, in the related earlier efforts.

A LIDAR system, however, directly measures the distance from surface to object. Therefore, once the surface map is generated, the reconstruction algorithm is a deterministic, noniterative ray-tracing program.

Figure 22:
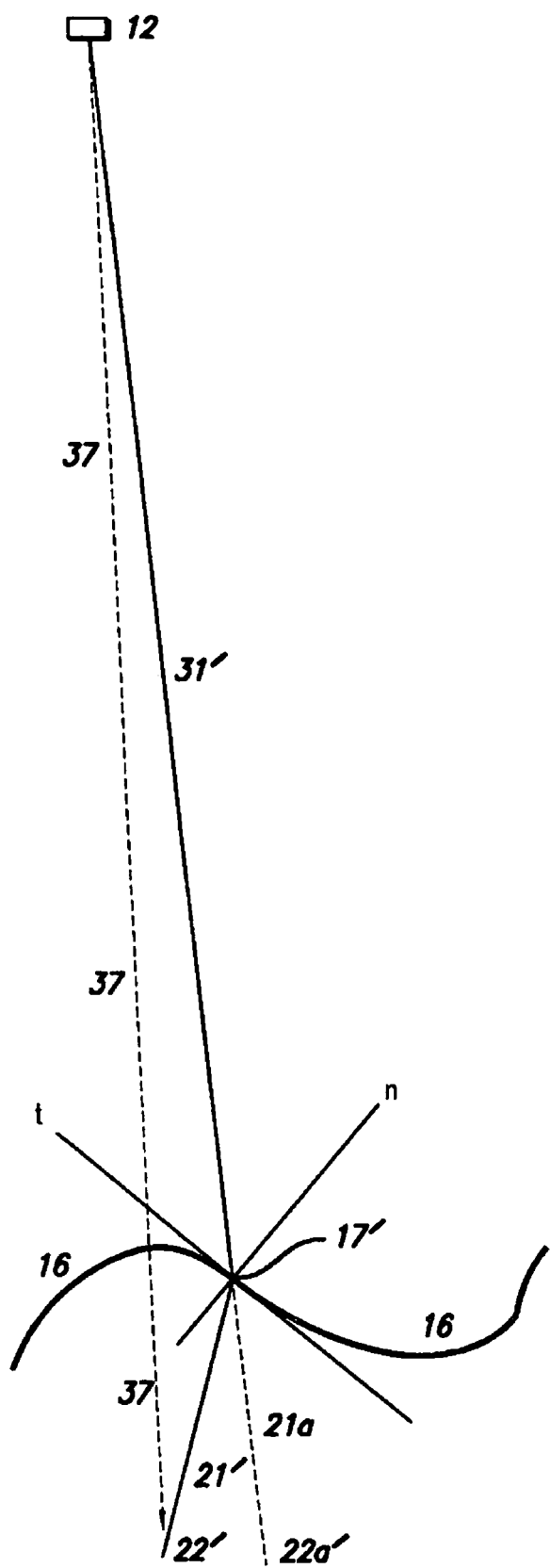
FIG. 22 is a diagram illustrating reconstruction of a submerged-object image by means of correction for oceansurface wave refraction.

The complete algorithm proceeds in simple steps: from a known position of the LIDAR subsystem 12 (FIG. 22), fan beam pulses probe the wave surface 16. For each pixel 17' the three-dimensional orientation of a corresponding ray 31' is known by the apparatus inherently.

The distance to the surface along the ray 31' is found by analysis of the pulse returns. Combined with the observing position and ray orientation, the system computer straightforwardly obtains the three-dimensional position of the pixel 17'.

The system likewise analyzes all the return delays for the surface, pixel by pixel, to construct a three-dimensional map of the surface 16. Simple differentiation of this surface map yields the slope of the surface at each pixel 17'—i. e., the three-dimensional orientation of the tangent plane t and the corresponding normal line 19.

Given the known angle $\phi_1$ at which the incident ray 31' lies to the normal 19, Snell's law yields directly the angle $\phi_2$ (in three dimensions) at which the refracted ray 21' lies to the same normal 19, namely—

$$\sin \phi_2 = n \sin \phi_1,$$

$$\text{or } \phi_2 = \sin^{-1}(n \sin \phi_1)$$

in which n is the index of refraction for the water. With this angle now known, the system has the true disposition 21' of the ray.

Now the system can also take into account the further return delay to an apparent object point 22a' seen behind the same pixel 17'. Although that apparent point 22a' is apparently positioned along the apparent or rectilinear extension 21a to the same ray 31', it is known to lie instead along the refracted, true ray disposition 21'.

The further return delay, considered in conjunction with the speed of light within the water, yields the additional range or distance within the water to the true object point 22'. This completes the true coordinates, relative to the observation apparatus 12, of that point 22'—so that in effect the apparatus has the actual bearings and length of a vector 37 from the observation platform directly to the true point 22'.

Given the instantaneous position and orientation of the platform, as for example through use of the Global Positioning System, the absolute coordinates of the true point 22' follow directly. Again, no iteration is required to find either the three-dimensional surface map or the object depth, as in the '493 patent and the Schmalz method respectively.

This algorithm accordingly runs very quickly. It is also straightforward to implement in a real-time computing system, suitable for object monitoring in routine surface-craft operations.

Furthermore no dual-base triangulation is required, since the present invention—unlike the system of the '493 patent—is capable of determining range as well as bearing, from a single observation station, for each object point. It is this which enables the invention to be operated from a single small, fixed-wing aircraft.

5. Intensity Equalization for a Fan Beam

The goal is to produce a nearly one-dimensional fan beam 711 (FIG. 23) from an incident laser beam 709 of conventional character, i. e., most typically of a very generally circular cross-sectional envelope, but roughly Gaussian across that section. As noted earlier, however, laser beams typically have both hot (bright) spots and dark specks within the beam cross-section—and these features as well as the overall energy distribution and indeed the effective centerline of the beam itself vary greatly during pulsed operation.

Preferred embodiments of the present invention (1) produce a fan beam of prescribed angular width independent of size, energy distribution, and position of the input laser beam 709; (2) enable shaping of the energy distribution across the fan beam; and as a kind of bonus also (3) homogenize the laser beam to remove any nonuniform spatial energy distributions in the laser beam.

The input laser beam 709 is incident on an array 721 of small lenses 722, which in this document are sometimes called "lenslets". For simple and easy of discussion, this document refers to the individual elements 722 as "cylindrical" but it is to be understood that this term refers to elements that are not truly cylindrical.

First, they might more precisely be termed "semicylindrical" or "planocylindrical" since they are not full rods but only shaped into generally cylindrical forms at one side (the output side), as the drawing shows. Second, for reasons that will become clear shortly their surfaces are preferably not any segments of circular cylinders.

Rather they are preferably segments of "cylinders" in the classical, general geometrical sense of being loci of a projection of a plane contour that is not circular. For many applications, right-circular plano cylindrical lenslets serve well, and it is only as a matter of preference for more highly demanding applications that noncircular forms are employed.

The input laser beam or other source beam 709 should be large enough to cover several lens elements 722. After the laser beam passes through the lens array 721, the spatial profile of the laser beam is homogenized by the mixing of the light after the array.

Each of the lenslets 722 expands the portion of the beam incident on it. Since the beam 709 is incident on many lenslets, there is considerable averaging in the angular distribution leaving the lens array.

Because the lenslets are overfilled with illumination, the numerical aperture of the lenses defines the angular divergence $\theta$—here the fan half-angle—of the light. The sine of the fan half-angle equals the numerical aperture NA, which in turn is established by the relationship between the focal properties of each lenslet surface and the physical aperture.

The only dependencies of this system upon the light itself are in relation to wavelength and collimation, both properties that are well-behaved in laser beams. These facts provide a key strength of the invention—namely, that the divergence of the light is independent of the size or energy distribution of the laser beam 709 and depends only on the numerical aperture of the lens.

Figure 24:
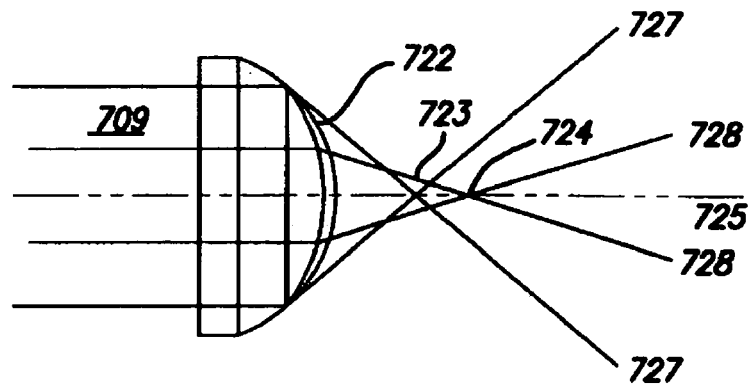
FIG. 24 is a like view, but enlarged, of a single lens element of the FIG. 23 array, showing certain focal relations for the lens.

FIG. 24 illustrates one lens in an array of positive cylindrical lenslets. The array may be fabricated either by casting or otherwise forming a unitary article as suggested by the illustration, or by forming individual lenslet elements and placing them side by side.

Each lenslet 722 nominally produces a line focus 723 of the input laser beam 709 after (i. e., downstream of) the lenslet. The term "nominally" appears here because, as is well known, common lenses are subject to spherical—or in the present environment, cylindrical—aberration.

Such aberration causes the focal position, as seen in section, to be a region or zone . . . 723-724 . . . , rather than a geometrical point or line. As the drawing suggests, the greatest angular divergence occurs for input rays that pass along the outside edge of the lens, and progressively tighter divergence angles arising from rays 727, 728 that traverse the lens successively closer to the optical axis 725.

Figure 26:
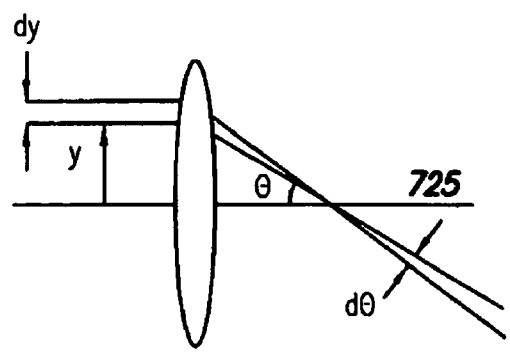
FIG. 26 is a like view showing a relationship between beam angle at the back of the lens and ray heights above the optical axis on the front of the lens.

At first glance it may appear desirable to prepare a lens that offers more-consistent ray divergence—i. e., a so-called "aplanatic" lens that is at least partially corrected for cylindrical aberration. Such a correction will be assumed in the first part of the analysis which follows shortly below (FIG. 26).

As will be seen, however, ray mixing from different lenslets has the effect of greatly reducing the importance of angular consistency within the fan produced by each lenslet considered individually. Furthermore, for present purposes, specification of surfaces for a high degree of angular consistency has certain drawbacks.

One such drawback is that inconsistent divergence angles can be exploited to adjust the angular energy distribution of the overall beam—to compensate for the secant effects discussed in an earlier section of this document. That exploitation will be discussed below.

Another potential drawback of highly consistent divergence angle is that all the optical energy passes through the foci of the several lenslets. In other words the lenslets form real images of the collimated input beam, and all the energy of the input beam passes through the array of these images.

A highly compensated system therefore concentrates in a minute, roughly planar zone—defined by the array of line foci of the several lenslets—all the power of the source beam. For good SNR in ocean-surveillance applications a very high-power beam is desirable; hence extraordinarily high energy densities arise at the focal sheet.

Figure 25:
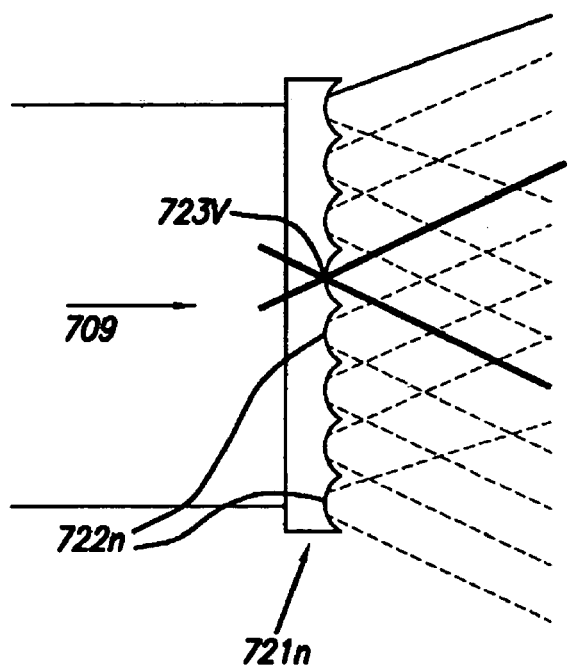
FIG. 25 is a view like FIG. 23 but with negative lenslets.

Such enormous concentrations of energy can lead to air breakdown and chaotic consequences. For high-power applications as mentioned earlier an array 721n of negative cylindrical lenslets 722n (FIG. 25) is better used. Each negative lenslet 722n can be made to produce a respective virtual image 723v rather than a real line image and thereby avoid the air-breakdown problem.

In a corrected lens the angle θ (FIG. 26) of a refracted ray leaving the lens is related to the height y of the ray above the optical axis 725. The relationship may be expressed by the following integral.

$$y = \int_0^\theta w(\alpha)d\alpha \qquad (1)$$

By taking derivatives of Eq. (1) and multiplying by the light irradiance incident on the lens, we obtain:

$$d\Phi = E dy = E w(\theta) d\theta \qquad (2)$$

where dΦ is the light flux contained in the differential height element and E is the irradiance (one-dimensional). It follows that the right hand side of Eq. (2) represents the amount of energy in the differential angle element.

Thus, the function w(θ) defines the angular weighting of the energy distribution. For an aplanatic lens, the relationship between the ray height and the refracted angle is given by—

$$y = f \sin\theta \qquad (3)$$

Thus, the angular weighting function, the derivative of sin(θ), is proportional to cos(θ). Most lenses, however, are not truly aplanatic.

Optical aberrations cause the distribution to vary from this ideal case. In fact, as predicted above, one may intentionally modify the shape of the lens surface to introduce "aberrations" to shape the light-intensity profile.

For a given lens, the angular weight function can be approximated from geometrical ray-tracing data by $$w(\theta) \cong \frac{\Delta y}{\Delta \theta}. \qquad (4)$$

This expression is very useful for specifying and analyzing the angular weighting function of an optical lens, using a lens specification program.

Figure 27:
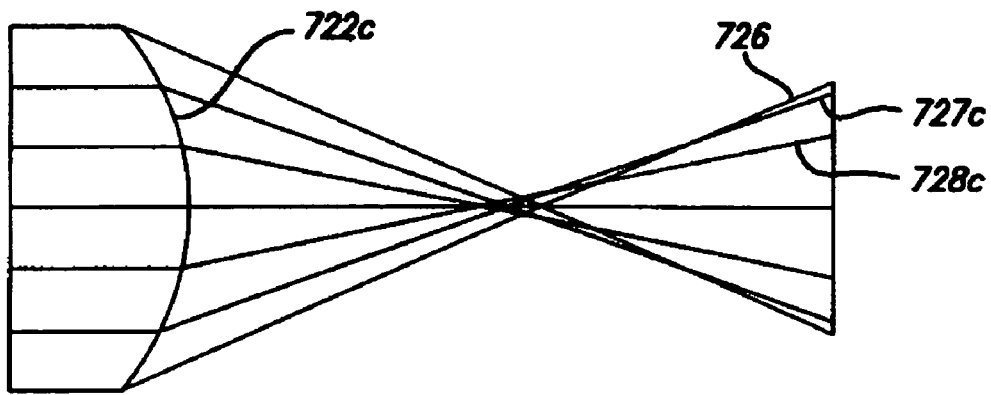
FIG. 27 is a like view of a lens optimized to increase the irradiance at the edge of the fan beam.

FIG. 27 shows a lens optimized to increase the irradiance at the edge of the fan beam—perceptible in the drawing in terms of the density of rays 726, 727c, 728c—to four times that at the center of the fan beam. The lens was optimized by varying the surface profile 722c of the refracting lens surface.

Figure 28:
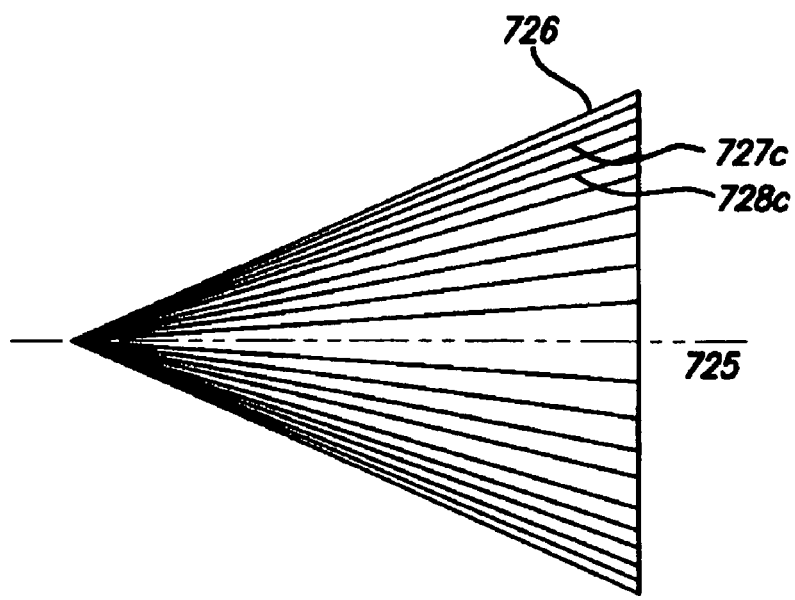
FIG. 28 is a like view of a fan beam generated by the lenslet array shown in FIG. 23 or 25.

FIG. 28 illustrates the angular ray distribution far from the lens. Again, the progressively higher ray density 726, 727c at the edge of the field of view corresponds to higher energy density than does the density 727c, 728c progressively closer to the axis 725.

Figure 23:
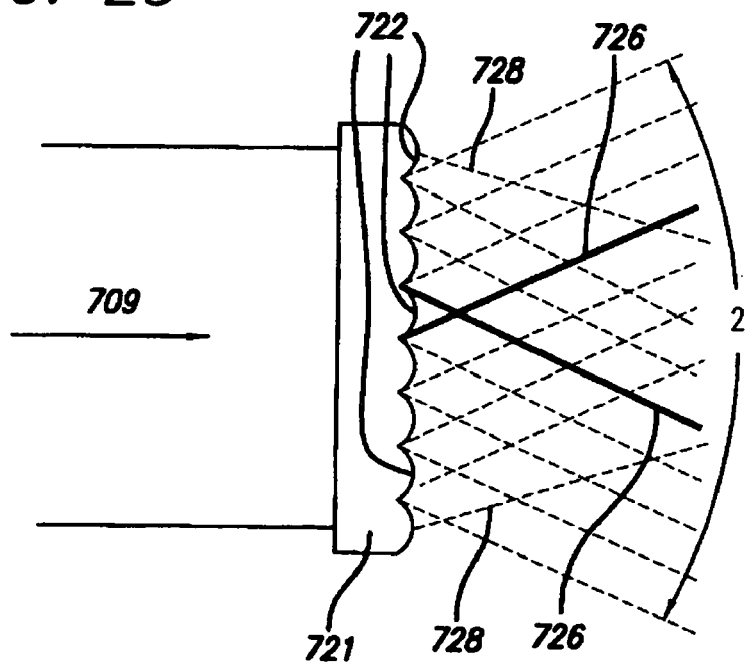
FIG. 23 is a somewhat schematic cross-sectional side elevation of a preferred embodiment of the invention that is a positive lenslet array (shown with related optical rays) that can be used to produce a fan beam from an incident collimated beam such as a laser beam.

Since laser light is coherent, when a laser source is to be used diffraction effects must be considered. The lens array behaves refractively, of course, but because it is periodic (as illustrated in FIG. 23) also behaves as a diffraction grating.

Thus the collimated light incident on the lens array is split into a number of diffracted beams. To adequately allow for these diffraction effects, diffraction theory must be taken into account.

The grating equation for normal incidence on the grating is given by:

$$\sin(\theta_m) = \frac{\lambda m}{D}, \qquad (5)$$

where $\theta_m$ is the diffracted angle for the $m^{th}$ order, and D is the width of the lens element. The numerical aperture NA of the lens defines the largest value of the left-hand side of Eq. (5); therefore we can rewrite the equation to give the total number N of diffracted orders across the full width of the fan beam as follows.

$$N = \frac{2DNA}{\lambda} \qquad (6)$$

In most applications of present interest, it is preferable that the number N of diffracted orders across the fan beam be sufficient to ensure that adjacent orders overlap and thereby render the fan beam effectively continuous. Otherwise the fan degenerates to a series of separated spots of light, which in some applications leaves unilluminated some regions of interest.

On the other hand, it will be understood by those skilled in the field that the invention encompasses deliberate introduction of such degeneracy and separation. In this regard the invention contemplates that some applications are advantageously provided with unilluminated or little-illuminated means positions along such a discontinuous fan pattern.

In certain of the appended apparatus claims, in reciting elements of the invention in the bodies of the claims, the term "such" is used as a definite article—i. e. instead of the word "the" or "said"—but only in cross-references back to elements of the environment or context of the claimed invention that first appear in the claim preambles. The purpose of this convention is to most-clearly point out those environmental or contextual features, so that they are not mistaken for or confused with components of the invention itself.

It will be understood that the foregoing disclosure is intended to be merely exemplary, and not to limit the scope of the invention—which is to be determined by reference to the appended claims.

What is claimed is:

1. A system for detecting, from an elevated position on a water craft that is in a body of water, discrete solid objects floating or submerged in said water, said objects being distinct from a bottom of the body of water; said system comprising:
    a LIDAR subsystem, mounted at such elevated position on such water craft, above the top of such body of water, for emitting thin fan-beam light pulses at a shallow angle relative to horizontal, and for detecting reflected portions of the fan-beam pulses at a like shallow angle relative to horizontal; and
    means for determining disposition of the LIDAR subsystem and using the determined disposition in interpreting the detected pulse portions.

2. The system of claim 1, wherein:
    the disposition comprises position and orientation.

3. The system of claim 1, further comprising:
means for determining geodetic localization of such objects.

4. The system of claim 1, for use with objects that are submerged at a range of depths less than ten meters; and wherein:
the shallow angle is in a range between one and fifteen degrees.

5. The system of claim 1, for use with objects that are submerged at a range of depths less than ten meters; and wherein:
the shallow angle is in a range between two and ten degrees.

6. The system of claim 1, for use with objects that are submerged at a range of depths less than ten meters; and wherein:
the shallow angle is on the order of five degrees.

7. A system for detecting discrete solid objects floating or submerged near a water craft that is in a body of water, said objects being distinct from a bottom of the body of water; said system comprising:
a LIDAR subsystem, mounted to the water craft at an elevated position thereof, for emitting thin fan-beam light pulses at a shallow angle relative to horizontal, and for detecting reflected portions of the fan-beam pulses at a like shallow angle relative to horizontal; and
means for determining disposition of the LIDAR sub-system and using the determined disposition in interpreting the detected pulse portions.

8. The system of claim 7, further comprising:
means for applying the detected pulse portions in determining geodetic localization of hazards associated with such objects.

9. A system for detecting floating or submerged objects near a water craft that is in a body of water, said objects being distinct from a bottom of said body of water; said system comprising:
means, mounted to the water craft at an elevated position thereof, above the top of such body of water, for emitting thin fan-beam light pulses at a shallow angle relative to horizontal, and for detecting reflected portions of the fan-beam pulses at a like shallow angle relative to horizontal; and
means for determining disposition of the emitting and detecting means and using the determined disposition in interpreting the detected pulse portions.

10. The system of claim 9, further comprising:
means for applying the detected pulse portions in determining geodetic localization of such objects.

11. The system of claim 9, further comprising:
means for controllably varying said angle of the emitting means.

12. The system of claim 11, wherein the varying means comprise:
an adjustable mount, holding the emitting and detecting means in variable orientation.

13. The system of claim 12, wherein:
the mount comprises means for holding the emitting and detecting means in variable orientation in at least two degrees of freedom.

14. The system of claim 12, wherein the mount comprises:
a gimbal box.

15. The system of claim 11, further comprising:
means for stabilizing the fan beam in a selected orientation; and
means for servocontrolling the stabilizing means, based upon the determined disposition.

16. A system for detecting objects floating or submerged near a water craft that is in a body of water, said objects being distinct from a bottom of said body of water; said system comprising:
a LIDAR subsystem, mounted to such craft, for emitting thin fan-beam light pulses toward such objects;
means for imaging successive reflected fan-beam pulse portions in a way that tightly localizes reflection from a water surface near such objects; and
means for determining disposition of the LIDAR subsystem and using the determined disposition in interpreting the imaged reflected pulse portions.

17. A system for detecting objects floating or submerged near a water craft in a body of water, said objects being distinct from a bottom of said body of water; said system comprising:
means, mounted to such craft above the top of such body of water, for emitting thin fan-beam light pulses toward such objects;
means for imaging successive reflected fan-beam pulse portions in a way that tightly localizes reflection from a water surface near such objects; and
means for determining disposition of the emitting means and using the determined disposition in interpreting the imaged reflected pulse portions.

18. The system of claim 17, further comprising:
means for applying the interpreted pulse portions in determining geodetic localization of such objects.

19. A systems, mounted on a water craft, for detecting discrete solid objects floating or submerged in a body of water, said objects being distinct from a bottom of the body of water; said system comprising:
a first subsystem, mounted at an elevated position of such water craft, for emitting a series of light pulses;
a second subsystem, mounted to such water craft, for time resolving and interpreting reflected portions of the pulses; and
means for determining disposition of the first or second subsystem, or both, and using the determined disposition or dispositions in interpreting the time-resolved reflected pulse portions.

20. The system of claim 19, further comprising:
means for controllably varying orientation of at least the first subsystem.

21. The system of claim 20, wherein the varying means comprise:
an adjustable mount, holding at least the first subsystem in variable orientation.

22. The system of claim 21, wherein:
the mount comprises means for holding at least the first subsystem in variable orientation in at least two degrees of freedom.

23. The system of claim 19:
wherein the pulses are in the form of a thin fan-beam;
further comprising a gimbal box for holding at least the first subsystem in a variable orientation; and
means for servocontrolling the gimbal box to hold the fan-beam parallel to the horizon.

24. The system of claim 19, further comprising:
means for stabilizing at least the first subsystem in a selected orientation; and
means for servocontrolling the stabilizing means, based upon the determined disposition or dispositions.

* * * * *